United States Patent
Black et al.

(10) Patent No.: US 8,948,095 B2
(45) Date of Patent: Feb. 3, 2015

(54) INTERFERENCE MANAGEMENT IN A WIRELESS COMMUNICATION SYSTEM USING FREQUENCY SELECTIVE TRANSMISSION

(75) Inventors: Peter J. Black, San Diego, CA (US); Mingxi Fan, San Diego, CA (US); Sarut Vanichpun, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1140 days.

(21) Appl. No.: 12/276,906

(22) Filed: Nov. 24, 2008

(65) Prior Publication Data
US 2009/0252099 A1 Oct. 8, 2009

Related U.S. Application Data

(60) Provisional application No. 60/990,541, filed on Nov. 27, 2007, provisional application No. 60/990,547, filed on Nov. 27, 2007, provisional application No. 60/990,459, filed on Nov. 27, 2007, provisional (Continued)

(51) Int. Cl.
*H04W 4/00* (2009.01)
*H04W 72/08* (2009.01)
*H04L 25/03* (2006.01)

(52) U.S. Cl.
CPC ....... *H04W 72/085* (2013.01); *H04L 25/03343* (2013.01)
USPC .......................................... 370/329; 370/341

(58) Field of Classification Search
CPC ............ H04L 25/03343; H04L 5/0062; H04L 5/0048; H04W 72/085; H04W 48/08; H04W 52/24; H04W 24/02; H04W 84/02
See application file for complete search history.

(56) References Cited

U.S. PATENT DOCUMENTS 5,329,530 A 7/1994 Kojima
5,528,597 A 6/1996 Gerszberg et al.
(Continued)

FOREIGN PATENT DOCUMENTS

CA 2538576 A1 9/2006
CN 1140938 A 1/1997
(Continued)

OTHER PUBLICATIONS

Gruenheid R., et al., "Adaptive Modulation and Multiple Access for the OFDM Transmission Technique" May 1, 2000, Wireless Personal Communications, Springer, Dordrecht, NL, pp. 5-13, XP000894156 ISSN: 0929-6212 abstract p. 9, paragraph 5.2—p. 10.
(Continued)

*Primary Examiner* — Chi H Pham
*Assistant Examiner* — Soon-Dong D Hyun

(57) ABSTRACT

Interference that occurs during wireless communication may be managed by determination of a selected transmit waveform exhibiting a preferred channel quality. A method, apparatus and medium of communication determine a transmit waveform from among a plurality of allocated waveforms of an unplanned access point to an associated access terminal. The transmit waveform exhibiting a highest channel quality with an associated access terminal over others of the plurality of allocated waveforms is determined. Signals are transmitted according to the transmit waveform from the unplanned access point to the associated access terminal.

40 Claims, 19 Drawing Sheets

Related U.S. Application Data application No. 60/990,513, filed on Nov. 27, 2007, provisional application No. 60/990,564, filed on Nov. 27, 2007, provisional application No. 60/990,570, filed on Nov. 27, 2007.

(56) References Cited

U.S. PATENT DOCUMENTS

| | | |
|---|---|---|
| 5,579,373 A | 11/1996 | Jang |
| 5,582,597 A | 12/1996 | Brimhall et al. |
| 5,594,720 A | 1/1997 | Papadopoulos et al. |
| 5,758,271 A | 5/1998 | Rich et al. |
| 5,787,346 A | 7/1998 | Iseyama |
| 5,852,630 A | 12/1998 | Langberg et al. |
| 5,892,796 A | 4/1999 | Rypinski |
| 6,005,856 A | 12/1999 | Jensen et al. |
| 6,038,223 A | 3/2000 | Hansson et al. |
| 6,061,549 A | 5/2000 | Labonte et al. |
| 6,301,242 B1 | 10/2001 | Lindsay et al. |
| 6,496,706 B1 | 12/2002 | Jou et al. |
| 6,535,739 B1 | 3/2003 | Chen et al. |
| 6,577,671 B1 | 6/2003 | Vimpari |
| 6,594,238 B1 | 7/2003 | Wallentin et al. |
| 6,597,668 B1 | 7/2003 | Schafer et al. |
| 6,597,705 B1 | 7/2003 | Rezaiifar et al. |
| 6,680,902 B1 | 1/2004 | Hudson |
| 6,690,657 B1 | 2/2004 | Lau et al. |
| 6,765,898 B1 | 7/2004 | Bloch |
| 6,768,444 B2 | 7/2004 | Langsford |
| 6,879,829 B2 | 4/2005 | Dutta et al. |
| 7,003,310 B1 | 2/2006 | Youssefmir et al. |
| 7,016,319 B2 | 3/2006 | Baum et al. |
| 7,099,298 B2 | 8/2006 | Kim |
| 7,106,707 B1 | 9/2006 | Strutt |
| 7,139,284 B1 | 11/2006 | Furukawa et al. |
| 7,155,655 B2 | 12/2006 | Cheng |
| 7,162,204 B2 | 1/2007 | Hansen et al. |
| 7,185,257 B2 | 2/2007 | Kim et al. |
| 7,239,622 B2 | 7/2007 | Black |
| 7,260,761 B2 | 8/2007 | Dottling et al. |
| 7,266,393 B2 | 9/2007 | Latva-Aho et al. |
| 7,302,276 B2 | 11/2007 | Bernhardsson et al. |
| 7,373,128 B2 | 5/2008 | Dowling |
| 7,379,958 B2 | 5/2008 | Karhu |
| 7,401,236 B2 | 7/2008 | Adachi |
| 7,430,431 B2 | 9/2008 | Harris et al. |
| 7,468,966 B2 | 12/2008 | Baker et al. |
| 7,489,720 B2 | 2/2009 | Hinton et al. |
| 7,492,751 B2 | 2/2009 | Kim |
| 7,519,324 B2 | 4/2009 | Jacomb-Hood et al. |
| 7,525,909 B2 | 4/2009 | Fan et al. |
| 7,539,165 B2 | 5/2009 | Toskala et al. |
| 7,539,501 B2 | 5/2009 | Moorti et al. |
| 7,564,827 B2 | 7/2009 | Das et al. |
| 7,574,179 B2 | 8/2009 | Barak et al. |
| 7,620,370 B2 * | 11/2009 | Barak et al. ............... 455/67.13 |
| 7,627,293 B2 | 12/2009 | Bhandari et al. |
| 7,680,026 B2 | 3/2010 | Stopler |
| 7,693,125 B2 | 4/2010 | Ihm et al. |
| 7,756,519 B2 | 7/2010 | Barak et al. |
| 7,764,661 B2 | 7/2010 | Heo et al. |
| 7,839,939 B2 | 11/2010 | Lee et al. |
| 7,864,744 B2 | 1/2011 | Song et al. |
| 7,864,877 B2 | 1/2011 | Hottinen |
| 7,907,571 B2 | 3/2011 | Raghothaman et al. |
| 7,920,544 B2 | 4/2011 | Soliman et al. |
| 7,974,230 B1 | 7/2011 | Talley et al. |
| 8,060,104 B2 | 11/2011 | Chaudhri et al. |
| 8,483,620 B2 | 7/2013 | Horn et al. |
| 8,700,083 B2 | 4/2014 | Yavuz et al. |
| 8,712,461 B2 | 4/2014 | Yavuz et al. |
| 2001/0049295 A1 | 12/2001 | Matsuoka et al. |
| 2002/0051433 A1 | 5/2002 | Affes et al. |
| 2002/0136179 A1 | 9/2002 | Aoyama et al. |
| 2002/0154621 A1 | 10/2002 | Laroia et al. |
| 2002/0167907 A1 | 11/2002 | Sarkar et al. |
| 2002/0168993 A1 | 11/2002 | Choi et al. |
| 2003/0086364 A1 | 5/2003 | Horne |
| 2003/0109274 A1 | 6/2003 | Budka et al. |
| 2003/0128679 A1 | 7/2003 | Ishiguro et al. |
| 2003/0206576 A1 | 11/2003 | Seo |
| 2004/0092281 A1 | 5/2004 | Burchfiel |
| 2004/0114552 A1 | 6/2004 | Lim et al. |
| 2004/0141568 A1 | 7/2004 | Huat |
| 2004/0147287 A1 | 7/2004 | Nelson, Jr. et al. |
| 2004/0151264 A1 | 8/2004 | Montojo et al. |
| 2004/0160925 A1 | 8/2004 | Heo et al. |
| 2004/0179480 A1 | 9/2004 | Attar et al. |
| 2005/0003827 A1 * | 1/2005 | Whelan ..................... 455/454 |
| 2005/0070287 A1 | 3/2005 | Cave et al. |
| 2005/0201351 A1 | 9/2005 | Nakao |
| 2006/0019679 A1 | 1/2006 | Rappaport et al. |
| 2006/0039273 A1 | 2/2006 | Gore et al. |
| 2006/0094436 A1 | 5/2006 | Kim et al. |
| 2006/0104242 A1 | 5/2006 | Kim et al. |
| 2006/0104254 A1 | 5/2006 | Shin et al. |
| 2006/0111137 A1 | 5/2006 | Mori et al. |
| 2006/0116154 A1 | 6/2006 | Han |
| 2006/0262754 A1 | 11/2006 | Andersson et al. |
| 2007/0004423 A1 | 1/2007 | Gerlach et al. |
| 2007/0010203 A1 | 1/2007 | Wee et al. |
| 2007/0047552 A1 * | 3/2007 | Astely ..................... 370/395.4 |
| 2007/0087749 A1 | 4/2007 | Ionescu et al. |
| 2007/0173199 A1 | 7/2007 | Sinha |
| 2007/0191051 A1 | 8/2007 | Suonvieri |
| 2007/0270155 A1 | 11/2007 | Nelson, Jr. et al. |
| 2007/0275729 A1 | 11/2007 | Kashima et al. |
| 2008/0008147 A1 * | 1/2008 | Nakayama ................ 370/338 |
| 2008/0031144 A1 | 2/2008 | Kawamoto et al. |
| 2008/0039129 A1 | 2/2008 | Li et al. |
| 2008/0062925 A1 | 3/2008 | Mate et al. |
| 2008/0069186 A1 | 3/2008 | Rice |
| 2008/0076407 A1 | 3/2008 | Shitara |
| 2008/0080364 A1 * | 4/2008 | Barak et al. ............... 370/210 |
| 2008/0089296 A1 | 4/2008 | Kazmi et al. |
| 2008/0130593 A1 | 6/2008 | Scheinert et al. |
| 2008/0144493 A1 * | 6/2008 | Yeh ......................... 370/230 |
| 2008/0222021 A1 | 9/2008 | Stanforth et al. |
| 2008/0225966 A1 | 9/2008 | Tseng et al. |
| 2008/0242243 A1 | 10/2008 | Kikuchi |
| 2008/0280575 A1 | 11/2008 | Pesola |
| 2008/0297415 A1 | 12/2008 | Berens et al. |
| 2008/0298488 A1 | 12/2008 | Shen et al. |
| 2008/0316957 A1 | 12/2008 | Shen et al. |
| 2009/0003305 A1 | 1/2009 | Gerstenberger et al. |
| 2009/0011765 A1 | 1/2009 | Inoue et al. |
| 2009/0017832 A1 * | 1/2009 | Tebbs et al. ................ 455/450 |
| 2009/0042593 A1 | 2/2009 | Yavuz et al. |
| 2009/0042596 A1 | 2/2009 | Yavuz et al. |
| 2009/0046632 A1 | 2/2009 | Nanda et al. |
| 2009/0047931 A1 | 2/2009 | Nanda et al. |
| 2009/0052395 A1 | 2/2009 | Bao et al. |
| 2009/0059907 A1 | 3/2009 | Sindhwani et al. |
| 2009/0069017 A1 | 3/2009 | Usuda et al. |
| 2009/0080386 A1 | 3/2009 | Yavuz et al. |
| 2009/0080499 A1 | 3/2009 | Yavuz et al. |
| 2009/0081970 A1 | 3/2009 | Yavuz et al. |
| 2009/0082026 A1 | 3/2009 | Yavuz et al. |
| 2009/0082027 A1 | 3/2009 | Yavuz et al. |
| 2009/0086861 A1 | 4/2009 | Yavuz et al. |
| 2009/0092111 A1 | 4/2009 | Horn et al. |
| 2009/0111473 A1 | 4/2009 | Tao et al. |
| 2009/0135754 A1 | 5/2009 | Yavuz et al. |
| 2009/0135790 A1 | 5/2009 | Yavuz et al. |
| 2009/0135796 A1 | 5/2009 | Nanda et al. |
| 2009/0137221 A1 | 5/2009 | Nanda et al. |
| 2009/0137241 A1 | 5/2009 | Yavuz et al. |
| 2009/0203320 A1 | 8/2009 | Horn et al. |
| 2009/0203372 A1 | 8/2009 | Horn et al. |
| 2009/0291690 A1 | 11/2009 | Guvenc et al. |
| 2010/0086092 A1 | 4/2010 | Wiatrowski et al. |
| 2010/0118996 A1 | 5/2010 | Sundaresan et al. |
| 2010/0128630 A1 * | 5/2010 | Barak et al. ............... 370/254 |
| 2010/0136989 A1 | 6/2010 | Westerberg et al. |

(56) References Cited

U.S. PATENT DOCUMENTS

| | | |
|---|---|---|
| 2010/0136998 A1 | 6/2010 | Lott et al. |
| 2010/0178921 A1 | 7/2010 | Aqvist et al. |
| 2010/0184423 A1 | 7/2010 | Kent et al. |
| 2011/0009065 A1 | 1/2011 | Carter |
| 2011/0090827 A1 | 4/2011 | Kattwinkel |
| 2011/0096708 A1 | 4/2011 | Novak et al. |
| 2011/0255520 A1 | 10/2011 | Chu et al. |
| 2012/0258746 A1 | 10/2012 | Tokgoz et al. |
| 2014/0233416 A1 | 8/2014 | Black et al. |

FOREIGN PATENT DOCUMENTS

| | | |
|---|---|---|
| CN | 1257385 A | 6/2000 |
| CN | 1281326 A | 1/2001 |
| CN | 1308824 A | 8/2001 |
| CN | 1463511 A | 12/2003 |
| CN | 1613224 A | 5/2005 |
| CN | 1728582 A | 2/2006 |
| CN | 1762117 A | 4/2006 |
| CN | 1853315 A | 10/2006 |
| CN | 1871573 A | 11/2006 |
| CN | 1989775 A | 6/2007 |
| CN | 101036314 A | 9/2007 |
| CN | 101043406 A | 9/2007 |
| EP | 0720405 A2 | 7/1996 |
| EP | 1035742 A1 | 9/2000 |
| EP | 1318613 A2 | 6/2003 |
| EP | 1503534 A1 | 2/2005 |
| EP | 1533910 A2 | 5/2005 |
| EP | 1564912 A1 | 8/2005 |
| EP | 1566917 A2 | 8/2005 |
| EP | 1710920 A1 | 10/2006 |
| EP | 1798884 A1 | 6/2007 |
| EP | 1838118 A1 | 9/2007 |
| GB | 2349045 | 10/2000 |
| GB | 2367455 | 4/2002 |
| GB | 2402023 A | 11/2004 |
| IL | 197172 A | 1/2013 |
| JP | 5122146 A | 5/1993 |
| JP | 9163431 A | 6/1997 |
| JP | 9200846 A | 7/1997 |
| JP | 9238378 A | 9/1997 |
| JP | H09261730 A | 10/1997 |
| JP | 2000287250 A | 10/2000 |
| JP | 2000316183 A | 11/2000 |
| JP | 2001127679 A | 5/2001 |
| JP | 2001251233 | 9/2001 |
| JP | 2002050988 A | 2/2002 |
| JP | 2002077043 A | 3/2002 |
| JP | 2002094483 A | 3/2002 |
| JP | 2003018074 A | 1/2003 |
| JP | 2003051775 A | 2/2003 |
| JP | 2003174400 A | 6/2003 |
| JP | 2003179450 A | 6/2003 |
| JP | 2004260489 A | 9/2004 |
| JP | 2005210703 A | 8/2005 |
| JP | 2005278163 A | 10/2005 |
| JP | 2005341415 A | 12/2005 |
| JP | 2006135673 A | 5/2006 |
| JP | 2006197639 A | 7/2006 |
| JP | 2007074047 A | 3/2007 |
| JP | 2007116730 A | 5/2007 |
| JP | 2007129497 A | 5/2007 |
| JP | 2007514367 A | 5/2007 |
| JP | 2007527649 A | 9/2007 |
| JP | 2007529915 A | 10/2007 |
| JP | 20007306407 A | 11/2007 |
| JP | 2008546235 A | 12/2008 |
| JP | 2009506655 | 2/2009 |
| JP | 2009514397 | 4/2009 |
| JP | 4740241 B2 | 8/2011 |
| KR | 20050055736 A | 6/2005 |
| KR | 20060129219 A | 12/2006 |
| KR | 20070064287 A | 6/2007 |
| KR | 20100044895 A | 4/2010 |
| RU | 2107994 C1 | 3/1998 |
| RU | 2111619 | 5/1998 |
| RU | 2198467 C2 | 2/2003 |
| RU | 2208880 C2 | 7/2003 |
| RU | 2210864 | 8/2003 |
| RU | 2210867 | 8/2003 |
| RU | 2212093 | 9/2003 |
| RU | 2002129901 A | 3/2004 |
| RU | 2242091 C2 | 12/2004 |
| RU | 2005111551 A | 9/2005 |
| RU | 2276458 C2 | 5/2006 |
| RU | 2278480 C2 | 6/2006 |
| RU | 2005138862 | 6/2006 |
| RU | 2300175 | 5/2007 |
| RU | 2305363 | 8/2007 |
| TW | 486894 B | 5/2002 |
| TW | 200421894 | 10/2004 |
| WO | 9210890 A1 | 6/1992 |
| WO | WO9512296 A1 | 5/1995 |
| WO | WO9619048 A2 | 6/1996 |
| WO | 9908464 A1 | 2/1999 |
| WO | 9933215 A1 | 7/1999 |
| WO | 9949595 A1 | 9/1999 |
| WO | 9960809 | 11/1999 |
| WO | WO0007377 A2 | 2/2000 |
| WO | WO0008751 | 2/2000 |
| WO | WO0062435 A1 | 10/2000 |
| WO | 0126269 A1 | 4/2001 |
| WO | 0178440 A1 | 10/2001 |
| WO | WO-03001834 A1 | 1/2003 |
| WO | WO03013190 A2 | 2/2003 |
| WO | WO03032564 | 4/2003 |
| WO | WO-2004028186 A2 | 4/2004 |
| WO | 2004086636 A2 | 10/2004 |
| WO | 2004114552 A1 | 12/2004 |
| WO | WO2004105294 | 12/2004 |
| WO | WO-2004114715 A2 | 12/2004 |
| WO | WO2005011145 A1 | 2/2005 |
| WO | 2005027265 A1 | 3/2005 |
| WO | 2005041515 | 5/2005 |
| WO | WO-2005057975 A1 | 6/2005 |
| WO | WO2005062798 A2 | 7/2005 |
| WO | 2006007318 A1 | 1/2006 |
| WO | 2006038694 A1 | 4/2006 |
| WO | WO-2006051867 A1 | 5/2006 |
| WO | 2006099547 A1 | 9/2006 |
| WO | 2006127617 A2 | 11/2006 |
| WO | WO-2006122805 A1 | 11/2006 |
| WO | 2007007662 A1 | 1/2007 |
| WO | 2007024895 A2 | 3/2007 |
| WO | 2007024932 | 3/2007 |
| WO | 2007050921 | 5/2007 |
| WO | 2007051148 | 5/2007 |
| WO | 2007077522 A2 | 7/2007 |
| WO | 2007095860 A1 | 8/2007 |
| WO | WO-2007090053 A1 | 8/2007 |
| WO | 2007100032 A1 | 9/2007 |
| WO | WO2007124111 A2 | 11/2007 |
| WO | 2008024340 A2 | 2/2008 |
| WO | 2008030934 A2 | 3/2008 |
| WO | 2009039426 | 3/2009 |
| WO | 2009039439 | 3/2009 |
| WO | WO2010006909 A1 | 1/2010 |

OTHER PUBLICATIONS

International Search Report & Written Opinion—PCT/US08/084743, International Search Authority—European Patent Office—Nov. 25, 2008.

International Search Report & Written Opinion—PCT/US2008/084741—International Search Authority, European Patent Office, Mar. 8, 2009.

International Search Report & Written Opinion—PCT/U52008/084749—International Search Authority, European Patent Office, Jun. 8, 2009.

International Search Report & Written Opinion—PCT/US2008/084732, International Search Authority—European Patent Office—Jun. 18, 2009.

(56) References Cited

OTHER PUBLICATIONS

International Search Report & Written Opinion—PCT/US2008/084738—International Search Authority, European Patent Office, Jun. 29, 2009.

International Search Report & Written Opinion—PCT/US2008/084754—International Search Authority—European Patent Office, Nov. 25, 2008.

Sean Ginevan: "Femtocells: Is There Room for Them on Your Network?" Internet Article Jul. 27, 2007, XP002510044 Retrieved from the Internet: URL:http://www.networkcomputing.com/arti cl e/printFullArticle.jhtml;jsessionid= GBC4GHJLLIWZCQSNDLPSKHSCJUNN2JVN?articleID= 20120 1521> [retrieved on Jan. 13, 2009] Heading: "Show me the ROI".; p. 2.

3GPP2: Medium Access Control Lyaer for Ultra Mobile Broadband (UMB) Air Interface Specification, ver. 1.0, Apr. 2007 also at http://www.3gpp2.org/Public_html/specs/C.S0084-002-0_v1.0_070423.pdf . pp. 3 & 34-39.

Goldsmith A.J., "Adaptive Coded Modulation for Fading Channels," IEEE Transactions on Communications, vol. 46, No. 5 (May 1998), pp. 595-602.

Tokgoz, Y., et al., "Uplink Interference Management for HSPA+ and 1xEVDO Femtocells", Global Telecommunications Conference (GLOBECOM), 2009, IEEE, Piscataway, NJ, USA, Nov. 30, 2009, pp. 1-7, XP031645438, ISBN: 978-1-4244-4148-8.

Ch'ng et al., "Femto Air Interface Deployment Modeling, Simulation, and Performance", 3GPP2, S00-FEMTO-20071015 021_ Airvana_AirInterface_Modeling_Simulation_Performance_R3, Oct. 15, 2007.

Fan et al., "Interference Management in Femto Cell Deployment", 3GPP2, S00-FEMTO-20071015-025_QCOM Femto Interference Management, Oct. 15, 2007.

Philips, "Text proposal for gating during compressed mode", TSGR1#19(01)0280, 3GPP, Mar. 2, 2001.

Wong et al., "Training sequence optimization in MIMO systems with colored interference," IEEE Trans. Commun., vol. 52, pp. 1939-1947, Nov. 2004.

Akin David: "Spectral Masks and Interference" CWNP Wireless Certification & Wireless Training, [Online] Sep. 20, 2007, XP002514078, Retreived From the Internet: URL:http://www.cwnp.com/community/articles/spectral_masks_and_inteference.html> [retrieved on Feb. 2005.

Taiwan Search Report—TW097146045—TIPO—Oct. 30, 2012.

Vankka J., et al., "FIR Filters for Compensating D/A Converter Frequency Response Distribution", IEEE, pp. 105-108, 2002.

Wikipedia: "Puncturing", the free encyclopedia, URL: http://en.wikipedia.org/wiki/Puncturing. Retrieved on Apr. 23, 2014, p. 1.

U.S. Appl. No. 14/307,416, filed Jun. 17, 2014 by Mehmet Yavuz.

Hansen C.J., "Thoughts on TX Spectral Masks for 802.11n," IEEE 802.11-04/0060r0, 2004, pp. 1-14.

* cited by examiner

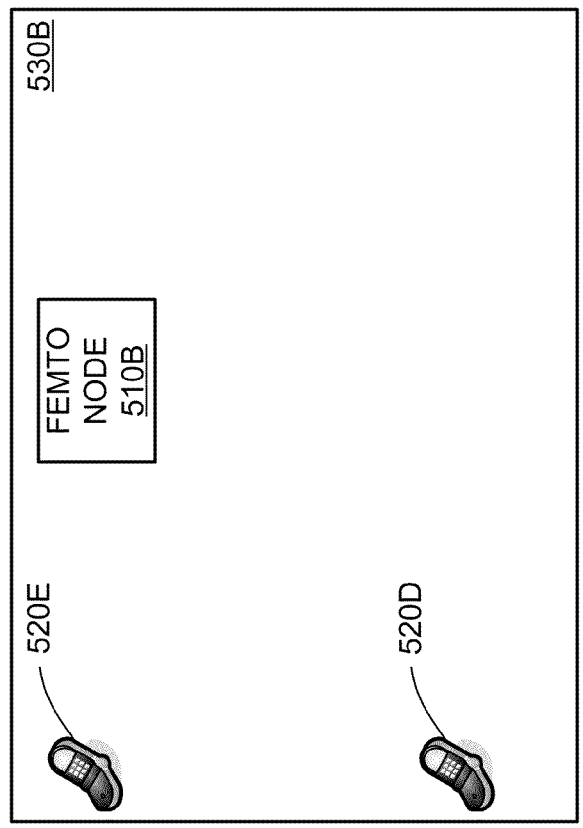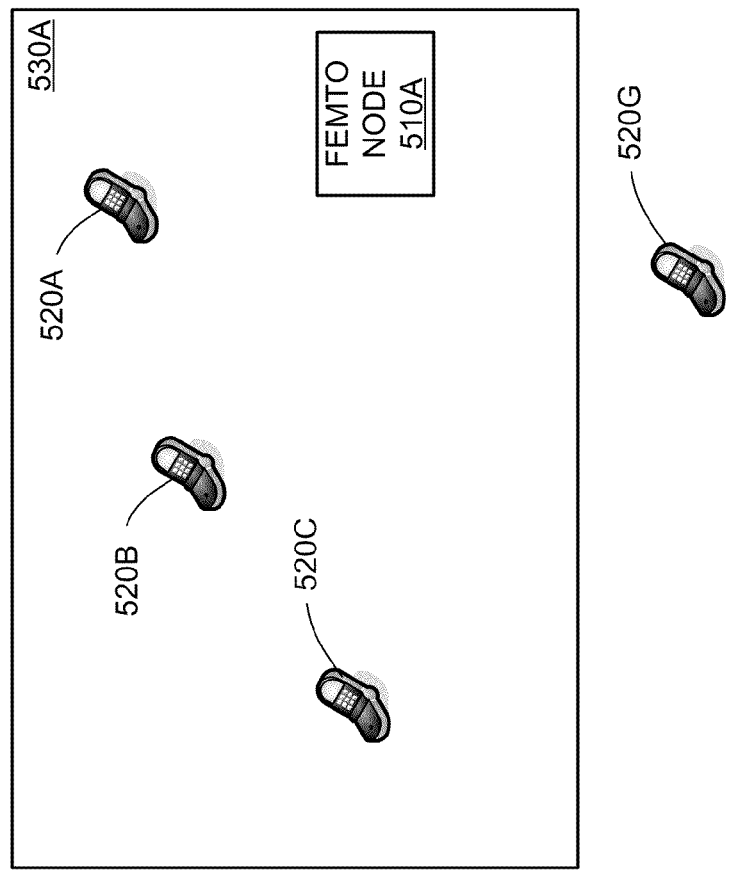
FIG. 5B

INTERFERENCE MANAGEMENT IN A WIRELESS COMMUNICATION SYSTEM USING FREQUENCY SELECTIVE TRANSMISSION

CLAIM OF PRIORITY UNDER 35 U.S.C. §119

This application claims the benefit of and priority to commonly owned U.S. Provisional Patent Application No. 60/990,541, filed Nov. 27, 2007, U.S. Provisional Patent Application No. 60/990,547, filed Nov. 27, 2007, U.S. Provisional Patent Application No. 60/990,459, filed Nov. 27, 2007, U.S. Provisional Patent Application No. 60/990,513, filed Nov. 27, 2007, U.S. Provisional Patent Application No. 60/990,564, filed Nov. 27, 2007, and U.S. Provisional Patent Application No. 60/990,570, filed Nov. 27, 2007, the disclosure of each of which is hereby incorporated by reference herein.

CROSS-REFERENCE TO RELATED APPLICATION

This application is related to concurrently filed and commonly owned:
U.S. patent application Ser. No. 12/276,894, entitled "INTERFERENCE MANAGEMENT IN A WIRELESS COMMUNICATION SYSTEM USING BEAM AND NULL STEERING," and;
U.S. patent application Ser. No. 12/276,897, entitled "INTERFERENCE MANAGEMENT IN A WIRELESS COMMUNICATION SYSTEM USING OVERHEAD CHANNEL POWER CONTROL," and;
U.S. patent application Ser. No. 12/276,916, entitled "INTERFERENCE MANAGEMENT IN A WIRELESS COMMUNICATION SYSTEM USING ADAPTIVE PATH LOSS ADJUSTMENT," and;
U.S. patent application Ser. No. 12/276,882, entitled "INTERFACE MANAGEMENT IN A WIRELESS COMMUNICATION SYSTEM USING SUBFRAME TIME REUSE," and;
U.S. patent application Ser. No. 12/276,932, entitled "INTERFACE MANAGEMENT IN WIRELESS COMMUNICATION SYSTEM USING HYBRID TIME REUSE," and; the disclosure of each of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access points, base stations, Home NodeBs, or femto cells. Typically, such small-coverage base stations are connected to the Internet and the mobile operator's network via a DSL router or a cable modem.

Since radio frequency ("RF") coverage of small-coverage base stations may not be optimized by the mobile operator and deployment of such base stations may be ad-hoc, RF interference issues may arise. Moreover, soft handover may not be supported for small-coverage base stations. Lastly a mobile station may not be allowed to communicate with the access point which has the best RF signal due to restricted association (i.e., closed subscriber group) requirement. Thus, there is a need for improved interference management for wireless networks.

SUMMARY

The disclosure relates to managing interference through determination of an optimal transmit waveform from an access point by using a proper frequency shaping (e.g., filtering). For a given access point, the transmitted waveform would be filtered by an optimal transmit filter selected from one of the allowed set of filters. By choosing the optimal waveform the perceived interference at a neighboring access terminal is reduced. In one exemplary embodiment, a method of communication includes determining an optimized transmit filter of an unplanned access point to an associated access terminal during a call therebetween. When the optimized transmit filter is determined, the overhead channel is transmitted from the unplanned access point with the optimized transmit filter to an associated access terminal.

In another exemplary embodiment, an apparatus for communication includes an interference controller configured to determine an optimized transmit filter to an associated access terminal during a call therebetween. When the optimized transmit filter has been determined, a communication controller transmits the overhead channel from the unplanned access point using the optimized transmit filter to the associated access terminal.

BRIEF DESCRIPTION OF THE DRAWINGS

These and other sample aspects of the disclosure will be described in the detailed description and the appended claims that follow, and in the accompanying drawings, wherein:

FIG. 5B is a simplified diagram of a specific arrangement of femto nodes and access terminals illustrating negative geometries;

Figure 1:
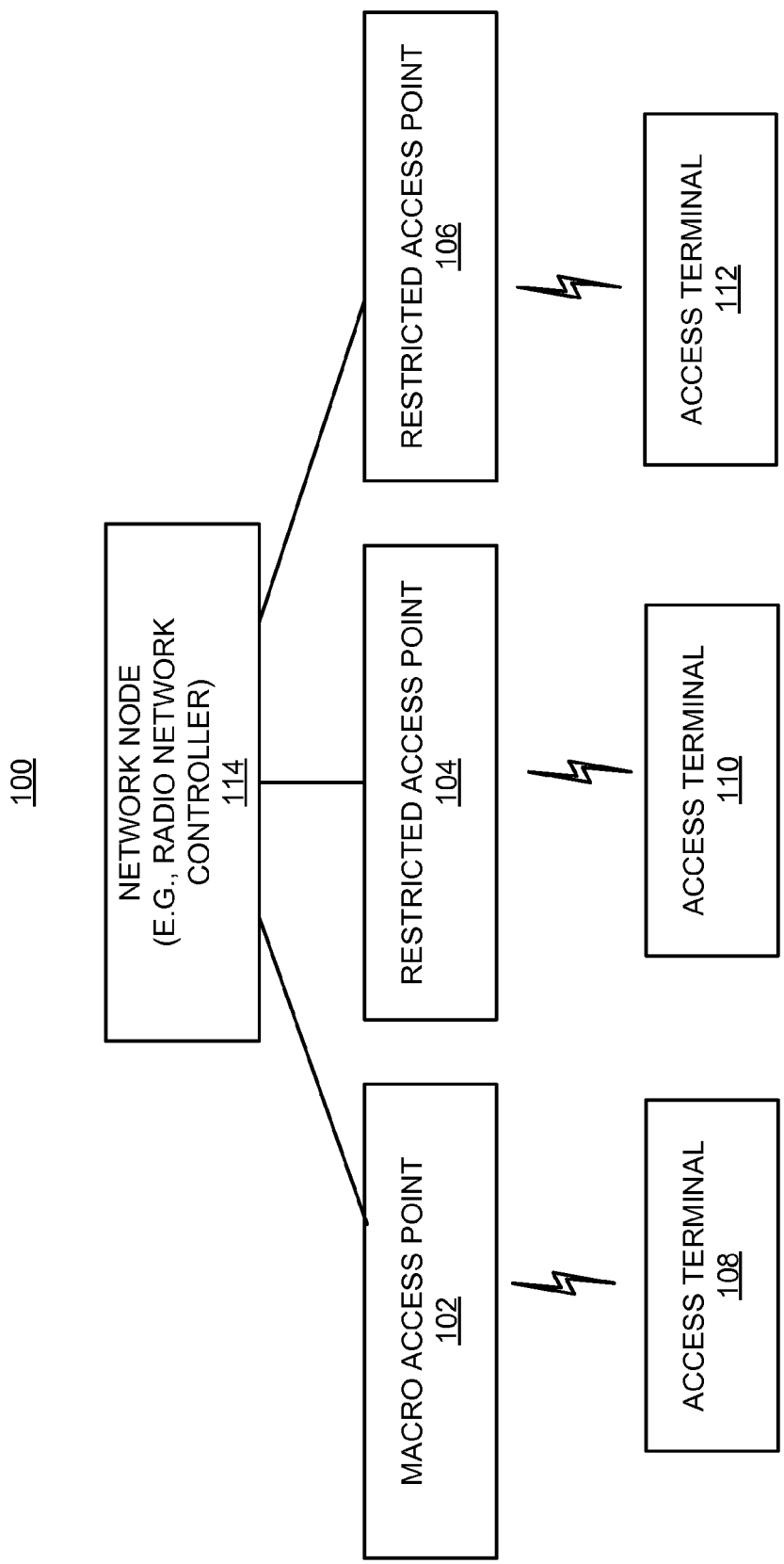
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point, base station, femto cell, and so on.

FIG. 1 illustrates sample aspects of a communication system 100 where distributed nodes (e.g., access points 102, 104, and 106) provide wireless connectivity for other nodes (e.g., access terminals 108, 110, and 112) that may be installed in or that may roam throughout an associated geographical area. In some aspects, the access points 102, 104, and 106 may communicate with one or more network nodes (e.g., a centralized network controller such as network node 114) to facilitate wide area network connectivity.

An access point such as access point 104 may be restricted whereby only certain access terminals (e.g., access terminal 110) are allowed to access the access point, or the access point may be restricted in some other manner. In such a case, a restricted access point and/or its associated access terminals (e.g., access terminal 110) may interfere with other nodes in the system 100 such as, for example, an unrestricted access point (e.g., macro access point 102), its associated access terminals (e.g., access terminal 108), another restricted access point (e.g., access point 106), or its associated access terminals (e.g., access terminal 112). For example, the closest access point to given access terminal may not be the serving access points for that access terminal. Consequently, transmissions by that access terminal may interfere with reception at the access terminal. As discussed herein, frequency reuse, frequency selective transmission, interference cancellation and smart antenna (e.g., beamforming and null steering) and other techniques may be employed to mitigate interference.

Sample operations of a system such as the system 100 will be discussed in more detail in conjunction with the flowchart of FIG. 2. For convenience, the operations of FIG. 2 (or any other operations discussed or taught herein) may be described as being performed by specific components (e.g., components of the system 100 and/or components of a system 300 as shown in FIG. 3). It should be appreciated, however, that these operations may be performed by other types of components and may be performed using a different number of components. It also should be appreciated that one or more of the operations described herein may not be employed in a given implementation.

For illustration purposes various aspects of the disclosure will be described in the context of a network node, an access point, and an access terminal that communicate with one another. It should be appreciated, however, that the teachings herein may be applicable to other types of apparatuses or apparatuses that are referred to using other terminology.

FIG. 3 illustrates several sample components that may be incorporated into the network node 114 (e.g., a radio network controller), the access point 104, and the access terminal 110 in accordance with the teachings herein. It should be appreciated that the components illustrated for a given one of these nodes also may be incorporated into other nodes in the system 100.

The network node 114, the access point 104, and the access terminal 110 include transceivers 302, 304, and 306, respectively, for communicating with each other and with other nodes. The transceiver 302 includes a transmitter 308 for sending signals and a receiver 310 for receiving signals. The transceiver 304 includes a transmitter 312 for transmitting signals and a receiver 314 for receiving signals. The transceiver 306 includes a transmitter 316 for transmitting signals and a receiver 318 for receiving signals.

In a typical implementation, the access point 104 communicates with the access terminal 110 via one or more wireless communication links and the access point 104 communicates with the network node 114 via a backhaul. It should be appreciated that wireless or non-wireless links may be employed between these nodes or other in various implementations. Hence, the transceivers 302, 304, and 306 may include wireless and/or non-wireless communication components.

The network node 114, the access point 104, and the access terminal 110 also include various other components that may be used in conjunction with interference management as taught herein. For example, the network node 114, the access point 104, and the access terminal 110 may include interference controllers 320, 322, and 324, respectively, for mitigating interference and for providing other related functionality as taught herein. The interference controller 320, 322, and 324 may include one or more components for performing specific types of interference management. The network node 114, the access point 104, and the access terminal 110 may include communication controllers 326, 328, and 330, respectively, for managing communications with other nodes and for providing other related functionality as taught herein. The network node 114, the access point 104, and the access terminal 110 may include timing controllers 332, 334, and 336, respectively, for managing communications with other nodes and for providing other related functionality as taught herein. The other components illustrated in FIG. 3 will be discussed in the disclosure that follows.

For illustrations purposes, the interference controller 320 and 322 are depicted as including several controller components. In practice, however, a given implementation may not employ all of these components. Here, a hybrid automatic repeat request (HARQ) controller component 338 or 340 may provide functionality relating to HARQ interlace operations as taught herein. A profile controller component 342 or 344 may provide functionality relating to transmit power profile or receive attenuation operations as taught herein. A timeslot controller component 346 or 348 may provide functionality relating to timeslot portion operations as taught herein. An antenna controller component 350 or 352 may provide functionality relating to smart antenna (e.g., beamforming and/or null steering) operations as taught herein. A receive noise controller component 354 or 356 may provide functionality relating to adaptive noise figure and path loss adjustment operations as taught herein. A transmit power controller component 358 or 360 may provide functionality relating to transmit power operations as taught herein. A time reuse controller component 362 or 364 may provide functionality relating to time reuse operations as taught herein.

Figure 2:
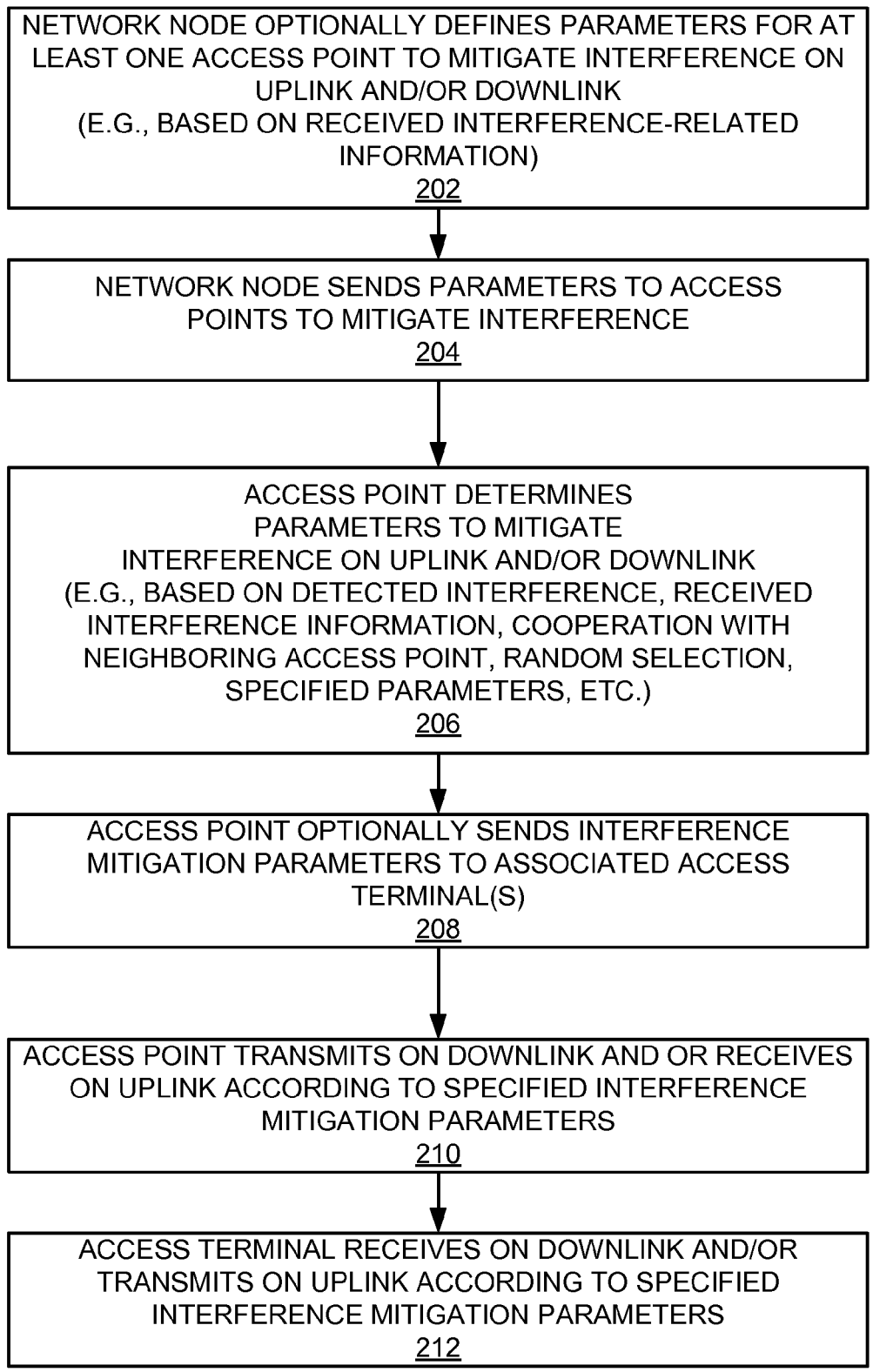
FIG. 2 is a simplified block diagram illustrating several sample aspects of components in a sample communication system.
Figure 3:
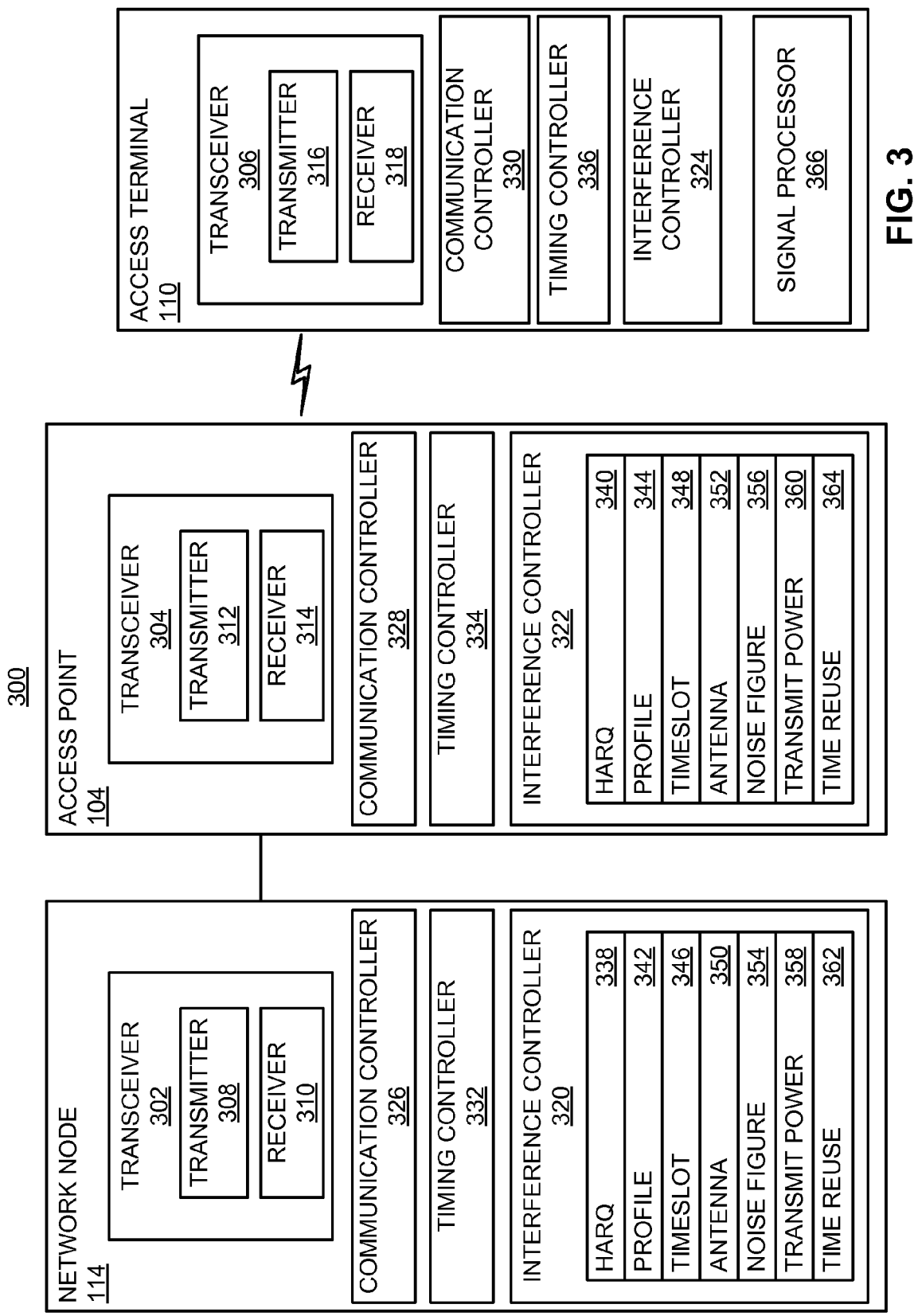
FIG. 3 is a flowchart of several sample aspects of operations that may be performed to manage interference.

FIG. 2 illustrates how the network node 114, the access point 104, and the access terminal 110 may interact with one another to provide interference management (e.g., interference mitigation). In some aspects, these operations may be employed on an uplink and/or on a downlink to mitigate interference. In general, one or more the techniques described by FIG. 2 may be employed in the more specific implementations that are described in conjunction with FIGS. 7-14 below. Hence, for purposes of clarity, the descriptions of the more specific implementations may not describe these techniques again in detail.

As represented by block 202, the network node 114 (e.g., the interference controller 320) may optionally define one or more interference management parameters for the access point 104 and/or the access terminal 110. Such parameters may take various forms. For example, in some implementations the network node 114 may define types of interference management information. Examples of such parameters will be described in more detail below in conjunction with FIGS. 7-14.

In some aspects, the definition of interference parameters may involve determining how to allocate one or more resources. For example, the operations of block 402 may involve defining how an allocated resource (e.g., a frequency spectrum, etc.) may be divided up for fractional reuse. In addition, the definition of fraction reuse parameters may involve determining how much of the allocated resource (e.g., how many HARQ interlaces, etc.) may be used by any one of a set of access points (e.g., restricted access points). The definition of fraction reuse parameters also may involve determining how much of the resource may be used by a set of access points (e.g., restricted access points).

In some aspects, the network node 114 may define a parameter based on received information that indicates whether there may be interference on an uplink or a downlink and, if so, the extent of such interference. Such information may be received from various nodes in the system (e.g., access points and/or access terminals) and in various ways (e.g., over a backhaul, over-the-air, and so on).

For example, in some cases one or more access points (e.g., the access point 104) may monitor an uplink and/or a downlink and send an indication of interference detected on the uplink and/or downlink to the network node 114 (e.g., on a repeated basis or upon request). As an example of the former case, the access point 104 may calculate the signals strength of signals it receives from nearby access terminals that are not associated with (e.g., served by) the access point 104 (e.g., access terminals 108 and 112) and report this to the network node 114.

In some cases, each of the access points in the system may generate a load indication when they are experiencing relatively high loading. Such an indication may take the form of, for example, a busy bit in 1xEV-DO, a relative grant channel ("RGCH") in 3GPP, or some other suitable form. In a conventional scenario, an access point may send this information to its associated access terminal via a downlink. However, such information also may be sent to the network node 114 (e.g., via the backhaul).

In some cases, one or more access terminals (e.g., the access terminal 110) may monitor downlink signals and provide information based on this monitoring. The access terminal 110 may send such information to the access point 104 (e.g., which may forward the information to the network node 114) or to the network node 114 (via the access point 104). Other access terminals in the system may send information to the network node 114 in a similar manner.

In some cases, the access terminal 110 may generate measurement reports (e.g., on repeated basis). In some aspects, such a measurement report may indicate which access points the access terminal 110 is receiving signals from, a received signal strength indication associated with the signals from each access point (e.g., Ec/Io), the path loss to each of the access points, or some other suitable type of information. In some cases a measurement report may include information relating to any load indications the access terminal 110 received via a downlink.

The network node 114 may then use the information from one or more measurement reports to determine whether the access point 104 and/or the access terminal 110 are relatively close to another node (e.g., another access point or access terminal). In addition, the network node 114 may use this information to determine whether any of these nodes interfere with any other one of these nodes. For example, the network node 114 may determine received signal strength at a node based on the transmit power of a node that transmitted the signals and the path loss between these nodes.

In some cases, the access terminal 110 may generate information that is indicative of the signal to noise ratio (e.g., signal and interference to noise ratio, SINR) on a downlink. Such information may comprise, for example a channel quality indication ("CQI"), a data rate control ("DRC") indication, or some other suitable information. In some cases, this information may be sent to the access point 104 and the access point 104 may forward this information to the network node 114 for use in interference management operations. In some aspects, the network node 114 may use such information to determine whether there is interference on a downlink or to determine whether interference in the downlink is increasing or decreasing.

As will be described in more detail below, in some cases the interference-related information may be used to determine how to mitigate interference. As one example, CQI or other suitable information may be received on a per-HARQ interlace basis whereby it may be determined which HARQ interlaces are associated with the lowest level of interference. A similar technique may be employed for other fractional reuse techniques.

It should be appreciated that the network node 114 may define parameters in various other ways. For example, in some cases the network node 114 may randomly select one or more parameters.

As represented by block 204, the network node 114 (e.g., the communication controller 326) sends the defined interference management parameters to the access point 104. As will be discussed below, in some cases the access point 104 uses these parameters and in some cases the access point 104 forwards these parameters to the access terminal 110.

In some cases, the network node 114 may manage interference in the system by defining the interference management parameters to be used by two or more nodes (e.g., access points and/or access terminals) in the system. For example, in the case of a fractional reuse scheme, the network node 114 may send different (e.g., mutually exclusive) interference management parameters to neighboring access points (e.g., access points that are close enough to potentially interfere with one another). As a specific example, the network node 114 may assign a first HARQ interlace to the access point 104 and assign a second HARQ interlace to the access point 106. In this way, communication at one restricted access point may not substantially interfere with communication at the other restricted access point.

As represented by block 206, the access point 104 (e.g., the interference controller 322) determines interference management parameters that it may use or that may send to the access terminal 110. In cases where the network node 114 defines the interference management parameters for the access point 104, this determination operation may simply involve receiving the specified parameters and/or retrieving the specified parameters (e.g., from a data memory).

In some cases the access point 104 determines the interference management parameters on its own. These parameters may be similar to the parameters discussed above in conjunction with block 202. In addition, in some cases these parameters may be determined in a similar manner as discussed above at block 202. For example, the access point 104 may receive information (e.g., measurement reports, CQI, DRC) from the access terminal 110. In addition, the access point 104 may monitor an uplink and/or a downlink to determine the interference on such a link. The access point 104 also may randomly select a parameter.

In some cases, the access point 104 may cooperate with one or more other access points to determine an interference management parameter. For example, in some cases the access point 104 may communicate with the access point 106 to determine which parameters are being used by the access point 106 (and thereby selects different parameters) or to negotiate the use of different (e.g., mutually exclusive) parameters. In some cases, the access point 104 may determine whether it may interfere with another node (e.g., based on CQI feedback that indicates that another node is using a resource) and, if so, define its interference management parameters to mitigate such potential interference.

As represented by block 208, the access point 104 (e.g., the communication controller 328) may send interference management parameters or other related information to the access terminal 110. In some cases this information may relate to power control (e.g., specifies uplink transmit power).

As represented by blocks 210 and 212, the access point 104 may thus transmit to the access terminal 110 on the downlink or the access terminal 110 may transmit to the access point 104 on the uplink. Here, the access point 104 may use its interference management parameters to transmit on the downlink and/or receive on the uplink. Similarly, the access terminal 110 may take these interference management parameters into account when receiving on the downlink or transmitting on the uplink.

In some implementations the access terminal 110 (e.g., the interference controller 306) may define one or more interference management parameters. Such a parameter may be used by the access terminal 110 and/or sent (e.g., by the communication controller 330) to the access point 104 (e.g., for use during uplink operations).

Figure 4:
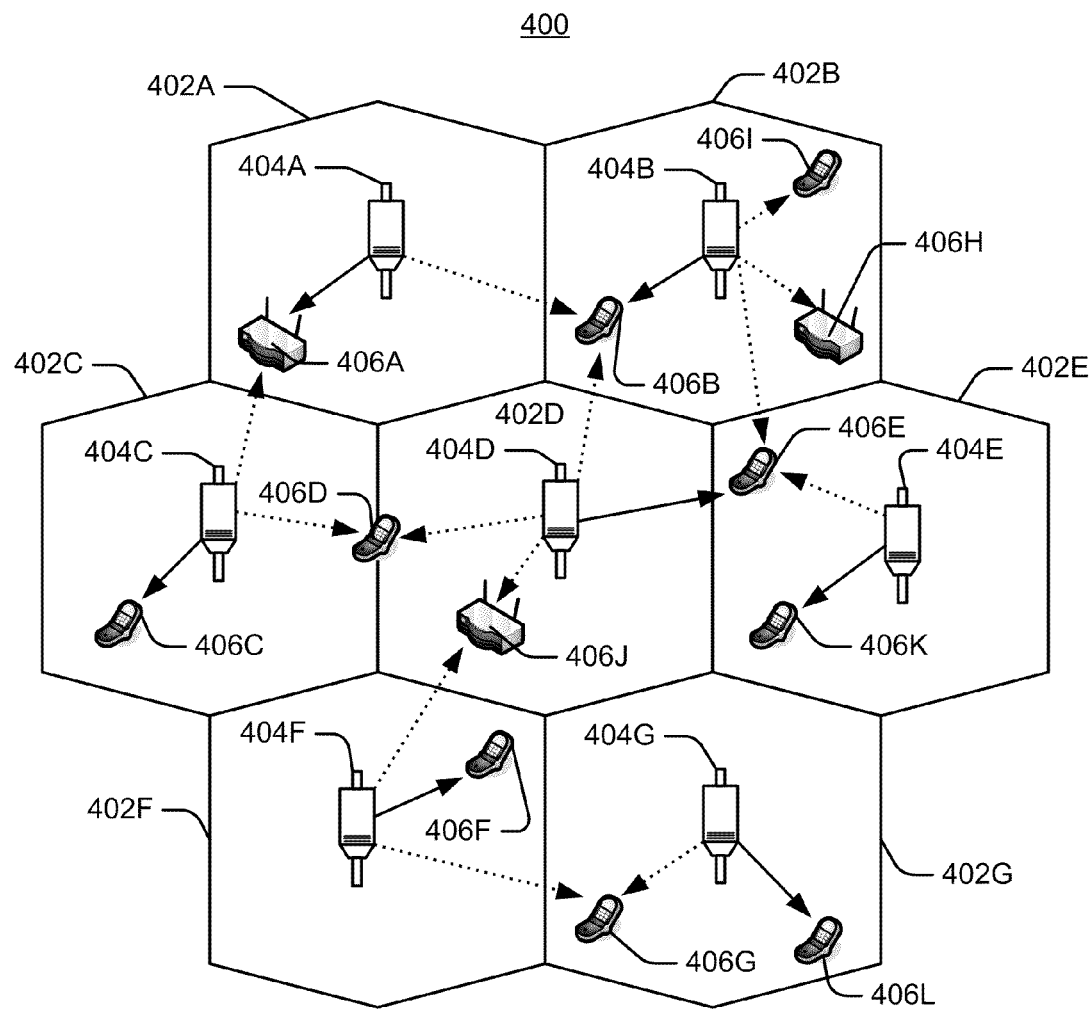
FIG. 4 is a simplified diagram of a wireless communication system.

FIG. 4 illustrates a wireless communication system 400, configured to support a number of users, in which the teachings herein may be implemented. The system 400 provides communication for multiple cells 402, such as, for example, macro cells 402A-402G, with each cell being serviced by a corresponding access node 404 (e.g., access nodes 404A-404G). As shown in FIG. 4, access terminals 406 (e.g., access terminals 406A-406L) may be dispersed at various locations throughout the system over time. Each access terminal 406 may communicate with one or more access nodes 404 on a downlink (DL) (also known as forward link (FL)) and/or an uplink (UL) (also known as a reverse link (RL)) at a given moment, depending upon whether the access terminal 406 is active and whether it is in soft handoff, for example. The wireless communication system 400 may provide service over a large geographic region. For example, macro cells 402A-402G may cover a few blocks in a neighborhood.

Figure 5A:
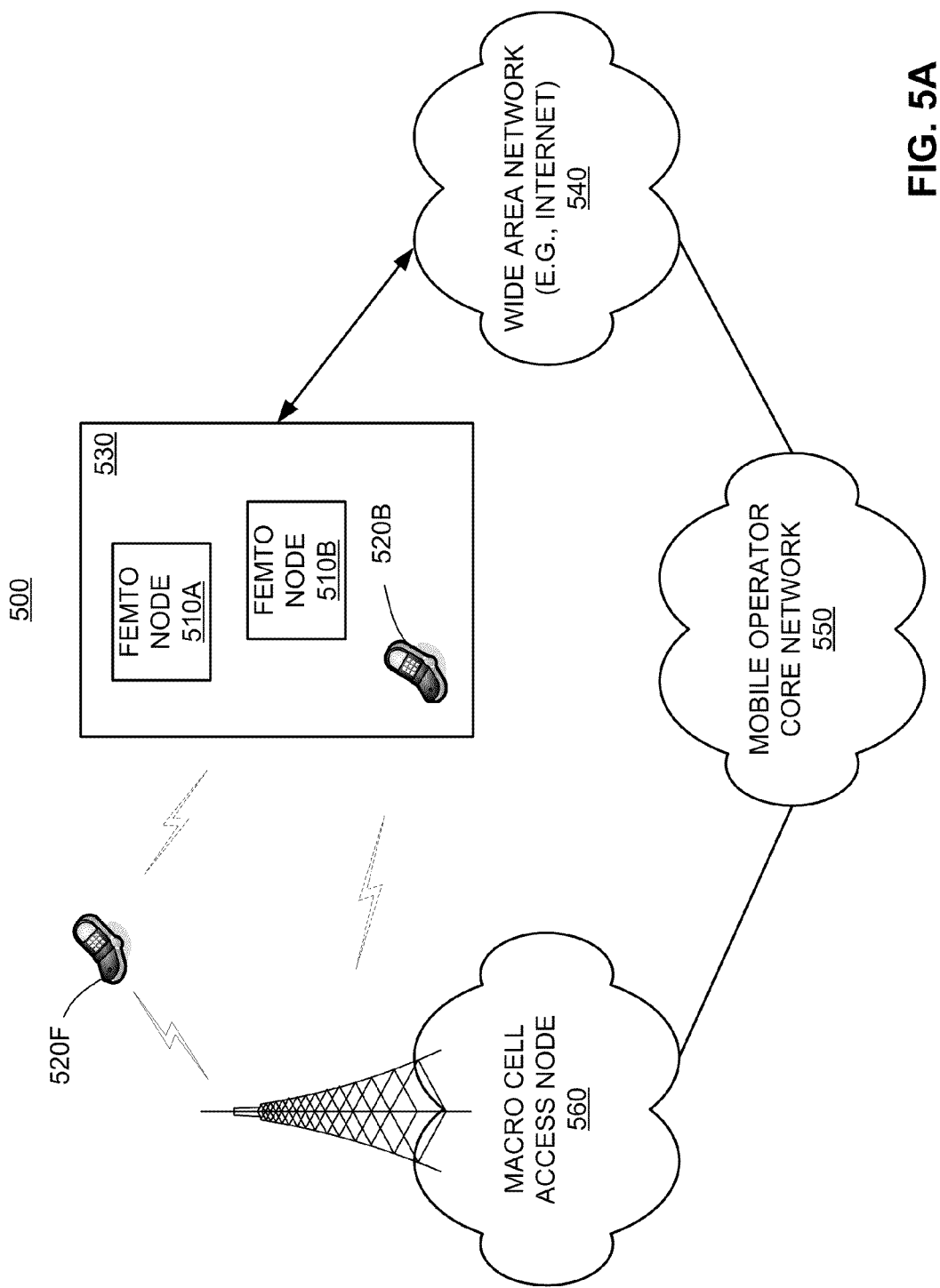
FIG. 5A is a simplified diagram of a wireless communication system including femto nodes.

As stated, a node or localized access point that provides coverage over a relatively small area (e.g., a residence) may be referred to as a femto node. FIG. 5A illustrates an exemplary communication system 500 where one or more femto nodes are deployed within a network environment. Specifically, the system 500 includes multiple femto nodes 510 (e.g., femto nodes 510A and 50B) installed in a relatively small scale network environment (e.g., in one or more user residences 530). Each femto node 510 may be coupled to a wide area network 540 (e.g., the Internet) and a mobile operator core network 550 via a DSL router, a cable modem, a wireless link, or other connectivity means (not shown). As will be discussed below, each femto node 510 may be configured to serve associated access terminals 520 (e.g., access terminal 520A) and, optionally, non-associated (alien) access terminals 520 (e.g., access terminal 520F). In other words, access to femto nodes 510 may be restricted whereby a given access terminal 520 may be served by a set of designated home femto node(s) 510 but may not be served by any non-designated foreign (alien) femto nodes 510 (e.g., a neighbor's femto node 510).

FIG. 5B illustrates a more detailed view of negative geometries of multiple femto nodes and access terminals within a network environment. Specifically, the femto node 510A and femto node 510B are respectively deployed in neighboring user residence 530A and user residence 530B. Access terminals 520A-520C are permitted to associate and communicate with femto node 510A, but not with femto node 510B. Likewise, access terminal 520D and access terminal 520E are permitted to associate and communicate with femto node 510B, but not with femto node 510A. Access terminal 520F and access terminal 520G are not permitted to associate or communicate with either femto node 510A or femto node 510B. Access terminal 520F and access terminal 520G may be associated with a macro cell access node 560 (FIG. 5A), or another femto node in another residence (not shown).

In unplanned femto node 510 deployments with restricted associations (i.e., an access point may not be allowed to associate with the "closest" femto node providing the most favorable signal quality), jamming and negative geometries can be common. Solutions to address these negative geometries will be further discussed below.

Figure 6:
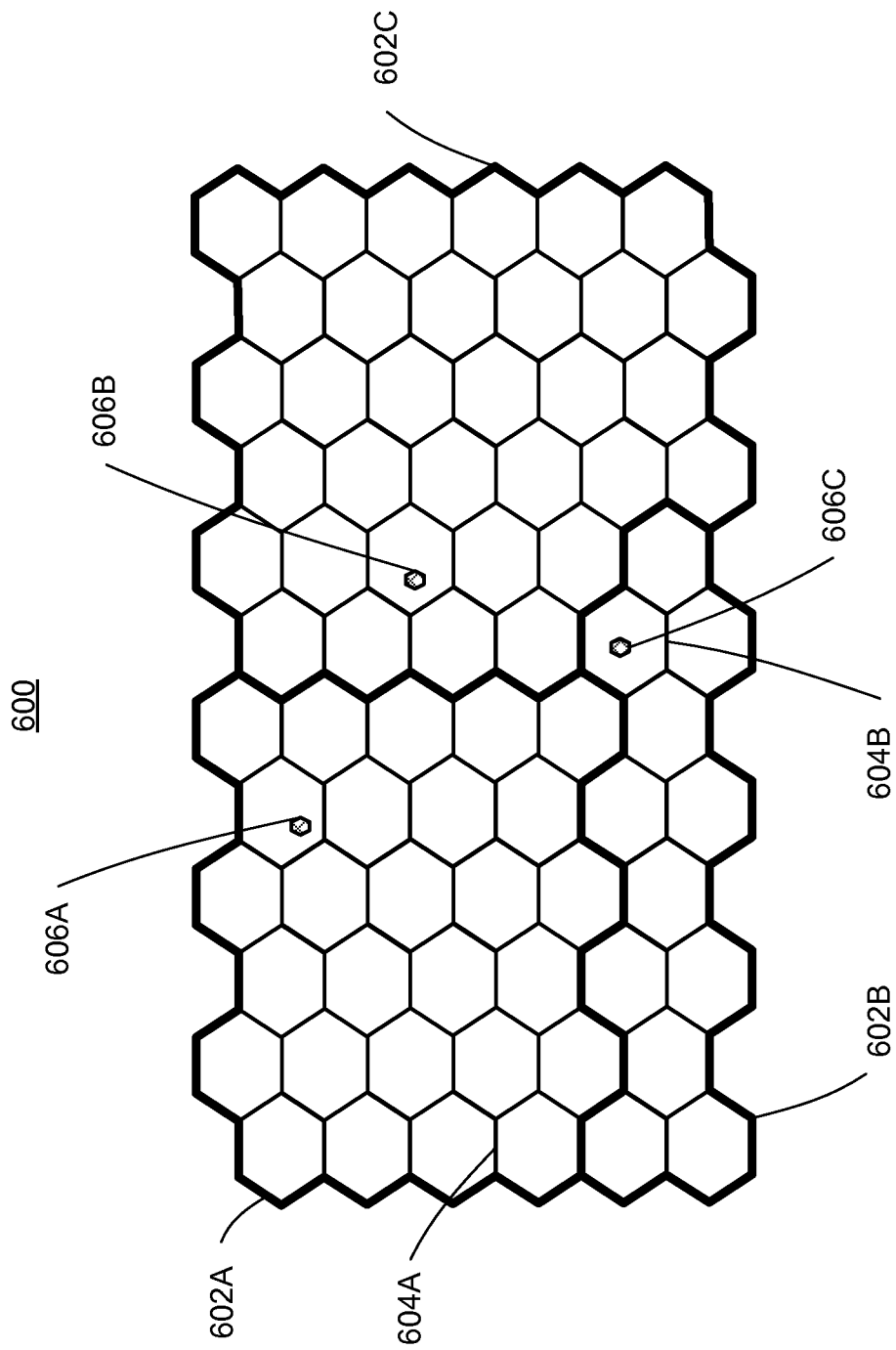
FIG. 6 is a simplified diagram illustrating coverage areas for wireless communication.

FIG. 6 illustrates an example of a coverage map 600 where several tracking areas 602 (or routing areas or location areas) are defined, each of which includes several macro coverage areas 604. Here, areas of coverage associated with tracking areas 602A, 602B, and 602C are delineated by the wide lines and the macro coverage areas 604 are represented by the hexagons. The tracking areas 602 also include femto coverage areas 606. In this example, each of the femto coverage areas 606 (e.g., femto coverage area 606C) is depicted within a macro coverage area 604 (e.g., macro coverage area 604B). It should be appreciated, however, that a femto coverage area 606 may not lie entirely within a macro coverage area 604. In practice, a large number of femto coverage areas 606 may be defined with a given tracking area 602 or macro coverage area 604. Also, one or more pico coverage areas (not shown) may be defined within a given tracking area 602 or macro coverage area 604.

Referring again to FIGS. 5A-5B, the owner of a femto node 510 may subscribe to mobile service, such as, for example, 3G mobile service, offered through the mobile operator core network 550. In addition, an access terminal 520 may be capable of operating both in macro environments and in smaller scale (e.g., residential) network environments. In other words, depending on the current location of the access terminal 520, the access terminal 520 may be served by an access node 560 of the macro cell mobile network 550 or by any one of a set of femto nodes 510 (e.g., the femto nodes 510A and 510B that reside within a corresponding user residence 530). For example, when a subscriber is outside his home, he is served by a standard macro access node (e.g., node 560) and when the subscriber is at home, he is served by a femto node (e.g., node 510A). Here, it should be appreciated that a femto node 520 may be backward compatible with existing access terminals 520.

A femto node 510 may be deployed on a single frequency or, in the alternative, on multiple frequencies. Depending on the particular configuration, the single frequency or one or more of the multiple frequencies may overlap with one or more frequencies used by a macro node (e.g., node 560).

In some aspects, an access terminal 520 may be configured to connect to a preferred femto node (e.g., the home femto node of the associated access terminal 520) whenever such connectivity is possible. For example, whenever the access terminal 520 is within the user's residence 530, it may be desired that the access terminal 520 communicate only with the home femto node 510.

In some aspects, if the access terminal 520 operates within the macro cellular network 550 but is not residing on its most preferred network (e.g., as defined in a preferred roaming list), the access terminal 520 may continue to search for the most preferred network (e.g., the home femto node 510) using a Better System Reselection ("BSR"), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 selects the femto node 510 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 510 that reside within the corresponding user residence 530). In some implementations, a node may be restricted to not provide, for at least one node, at least one of: signaling, data access, registration, paging, or service.

In some aspects, a restricted or foreign (alien) femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. A restricted or foreign (alien) femto node may refer to a femto node on which the access terminal is not authorized to access or operate on, except for perhaps emergency situations (e.g., 911 calls).

From a restricted or foreign femto node perspective, an associated or home access terminal may refer to an access terminal that authorized to access the restricted femto node. A guest access terminal may refer to an access terminal with temporary access to the restricted femto node. A non-associated (alien) access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the downlink (forward link) and uplink (reverse link). The downlink refers to the communication link from the base stations to the terminals, and the uplink refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the downlink (forward link) channel from the uplink (reverse link) channel. This enables the access point to extract transmit beam-forming gain on the downlink when multiple antennas are available at the access point.

As stated, in unplanned base station deployments with restricted association (i.e., a mobile station is not allowed to associate with the "closest" base station to which it has the strongest link), jamming and negative geometries can be common. In one exemplary embodiment spatially described in conjunction with FIG. 5B, the femto node 510A and femto node 510B are deployed in neighboring residences. Access terminals 520A-520C are permitted to associate and communicate with femto node 510A, but not with femto node 510B. Likewise, access terminals 520D-520E are permitted to associate and communicate with femto node 510B, but not with femto node 510A. Access terminals 520F-520G are not permitted to associate or communicate with either femto nodes 510A-510B. Access terminals 520F-520G may be associated with a macro cell access node 560 (FIG. 5A), or another femto node in another residence (not shown). Accordingly, such negative geometries respecting access-permitted femto nodes and neighboring access terminals may result if various interfering or jamming conditions on the uplink and downlink.

Uplink Jamming

By way of example, let $L_{A3}$ (dB) and $L_{A5}$ (dB) be the path loss between femto node 510A and access terminal 520C and access terminal 520D, respectively. In particular, $L_{A3}$ may be much larger than $L_{A5}$. Thus, when access terminal 520D transmits to its home femto node 510B, it causes excessive interference (or jamming) at femto node 510A, effectively blocking the reception of access terminals 520A-C at femto node 510A. In this uplink jamming situation, even if access terminal 520C transmits at its maximum Tx power $P_{3max}$, the received C/I for access terminal at femto node 510A may be characterized as:

$$C/I(AT\ 520C\ \text{at femto node}\ 510A) = P_{3max} - L_{A3} - (P_5 - L_{A5})(dB)$$

In some exemplary embodiments, depending on the transmit power $P_5$, the C/I of access terminal 520C at femto node 510A may be a very large negative value due to the large value of $L_{A3}$. Such a configuration geometry is referred to as a highly negative uplink geometry.

Downlink Jamming

Similarly, in one exemplary embodiment, $L_{B5}$ may be much larger than $L_{A5}$. This implies that when femto node 510A transmits to access terminal 520A, it may cause excessive interference (or jamming) at access terminal 520D, effectively blocking the reception of femto node 510B at access terminal 520D. In this downlink jamming situation, the received C/I for femto node 510B at access terminal 520D may be calculated as follows:

$$C/I(\text{femtocell}\ B\ \text{at}\ AT\ 5) = P_B - L_{B5} - (P_A - L_{A5})(dB)$$

Again, the C/I of femto node 510B at access terminal 520D may be a very large negative value due to the large value of $L_{B5}$. Such a configuration geometry is referred to as a highly negative downlink geometry.

A further practical consideration includes addressing negative geometries without necessitating modifications to the operation of deployed (legacy) access terminals. Therefore, it is desirable in the present exemplary embodiment to address interference mitigation from negative geometries through modification processes in a femto node rather than requiring modifications to access terminals. Accordingly, negative geometries at the uplink and downlink are desirably addressed according to an exemplary embodiment disclosed below.

Figure 7:
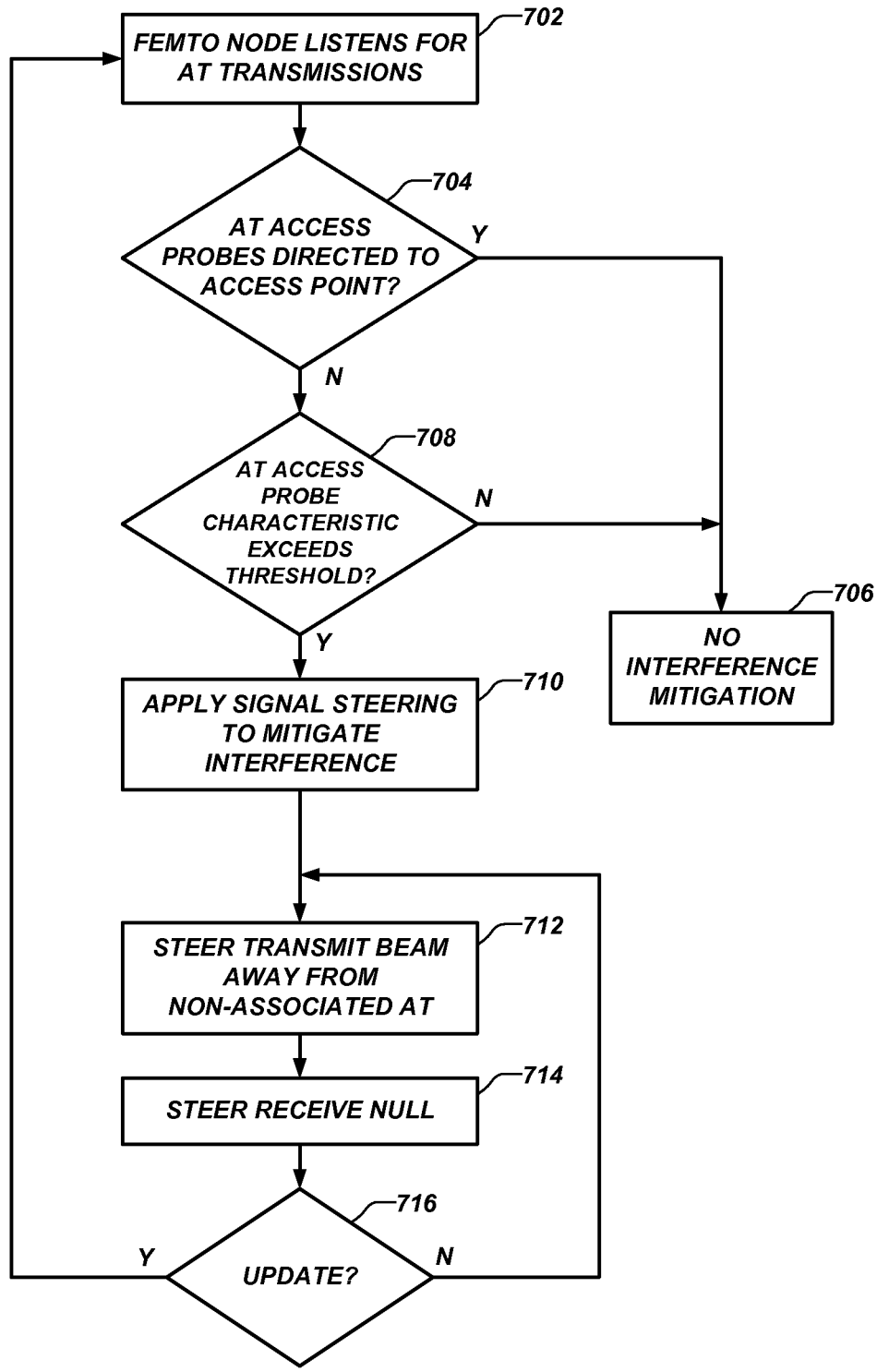
FIG. 7 is a flowchart of several sample aspects of operations that may be performed to manage interference through the use of beam and null steering.

Referring now to FIG. 7 and with further reference to FIGS. 5A-5B, operations relating to the use of beam-steering and null-steering to address jamming and negative geometries will be described in more detail. The present exemplary embodiment uses methods and apparatus to prevent jamming and negative geometries using beamsteering and null steering in unplanned base station deployments with restricted access.

In an exemplary femto node deployment scenario, nearby signals (desired or interference) may be Rician by nature which includes a strong directional component and flat fading across the frequency band (due to the small delay-spread and multiple reflected paths in indoor environments). Especially for jamming situations, sectorization may provide a desirable method for combating a strong Rician component of interference.

As represented by block 702, a femto node 510 continuously listens (i.e., receives according to the various receiver configurations describe herein) for transmissions from access terminals 520. As represented by query 704, the femto node 510 determines if an access probe (e.g., transmission) by an access terminal are directed to the femto node 510. If the detected access probe of the access terminal is directed to the specific femto node 510, then, as represented by block 706, no interference mitigation is necessary since the access terminal is an "associated" access terminal with the "home" femto node.

As represented by query 708, femto node 510 further compares a characteristic (e.g., power level) of the access probe for determining if the characteristic is of a sufficient threshold level to result in interference at the home femto node. When the access probe does not exceed an interference threshold, then, as represented by block 706, no interference mitigation is necessary since the characteristic of the access probe by the "home" femto node 510 results in acceptable interference.

As represented by block 710, when the home femto node 510 receives a sufficiently strong (i.e., greater than an interference threshold) access probe or otherwise strong uplink transmission from the non-associated access terminal 520, the home femto node 510 applies beam-forming (i.e., directional transmission and reception) antennas to steer signals or lack of signals (e.g., nulls) toward the non-associated access terminal 520 on the downlink and uplink.

By way of example, beam-forming (i.e., beam-steering) may be performed using a sectorized or directional (e.g., switched beam) antenna configuration described herein for forming a transmission signal beam and/or null or a reception signal beam and/or null. Specifically, interference nulling may be provided on a received Radio Frequency (RF) signal thereby reducing problems such as front-end overload and A/D desensitization of the receiver which results from jamming femto nodes. Furthermore, sectorized or directional antenna configurations enable the downlink and uplink to maintain the same directional component for use in both link directions.

As represented by block 712, downlink pilot and overhead transmissions, as well as traffic channel transmissions if any, are transmitted according to beam-forming such that minimal energy is directed towards a nearby non-associated access terminal. Steering a transmission signal away from a non-associated access terminal results in reduction in the negative geometry at the non-associated access terminal.

As represented by block 714, a directional null is steered towards the nearby non-associated access terminal 520 using the antenna configuration (e.g., sectorized antennas or null-steering with adaptive phased arrays) described herein. Therefore, when an associated access terminal 520 attempts to communicate with the home femto node 510, the associated access terminal's access probe, as well as other traffic (e.g., voice/data) communications is not jammed by the strong transmissions from the nearby non-associated access terminals having negative geometries.

As an example, if the access point employs two separate antennas AP can monitor the AT access probe characteristics on both antennas. If it is determined that the strong uplink transmission from the non-associated access terminal at one of the antennas, AP can turn off transmit function (beam steering) and turn off receive function (null steering) on that antenna.

As represented in query 716, periodically (e.g., once per second) the femto node 510 eliminates the sectorization null in the receive direction to determine, as represented in block 702, if the strong undesired non-associated access terminal 520 has moved or terminated its communication. If, as represented in query 704, the strong undesired signal has disappeared, the femto node 510 can eliminate the sectorization null and continue operation with omni-directional transmit and receive, as represented in block 706. If the strong undesired signal is still present or has moved and exceeds the threshold as represented by block 708, the femto node 510 can adjust the transmit and receive sectorization null steering, as represented in block 710, in the direction of the undesired non-associated access terminal 520.

The above-example with reference to FIG. 5B illustrates femto node 510A steering a receive and transmit sectorization null in the direction of non-associated access terminal 520D as long as non-associated access terminal 520D was present and in an active call with femto node 510B. When non-associated access terminal 520D is idle, femto node 510A would revert back to operating with omnidirectional transmit and receive.

During periods when the femto node is steering a sectorization null in a particular direction, if there are any associated access terminals 520 in the same direction they would experience outage. Accordingly, an exemplary embodiment, the femto node 510 steers the sectorization nulls (i) as long as the strong undesired non-associated access terminal 520 is active, and (ii) only if the undesired transmission from the non-associated access terminal 520 exceeds a high signal strength threshold at the receiver as determined at query 408, signifying that access probes from desired associated access terminals would not be decodable at the femto node 510. With reference to FIG. 5B, it is noted that femto node 510B would have no need to steer a sectorization null towards non-associated access terminal 520A since the signal from non-associated access terminal 520A is not very strong. If femto node 50B steers such a sectorization null towards non-associated access terminal 520A, the sectorization null would resulting an outage at desired associated access terminal 520E.

As a general case of the described method if the AP can not determine the direction of the interference from the non-associated access terminal (e.g., very strong jamming that saturates the AP receiver) it can try different directions for beam steering and null steering to maximize the received signal quality from associated AT.

Figure 8:
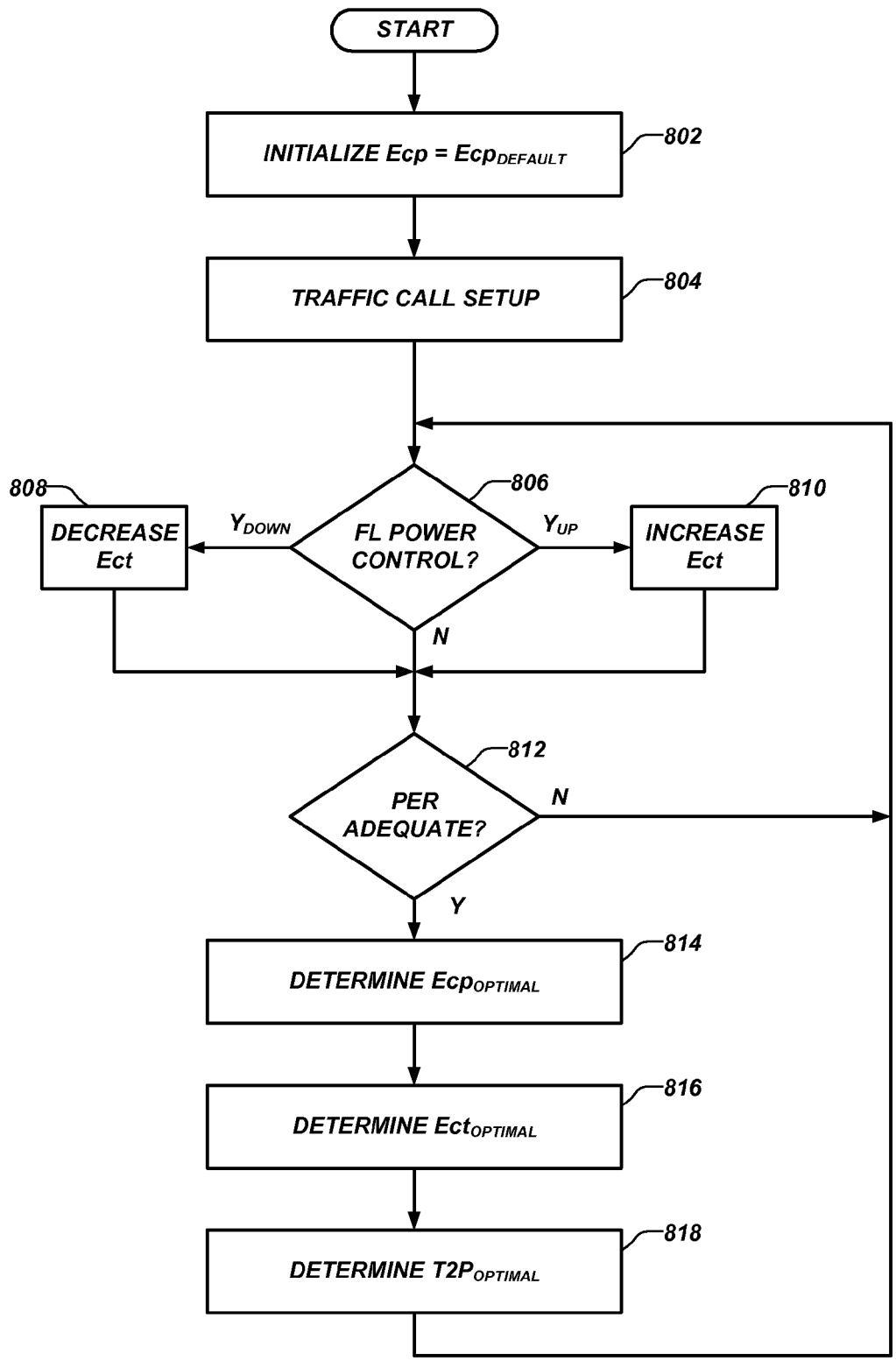
FIG. 8 is a flowchart of several sample aspects of operations that may be performed to manage interference through the use of optimized reduced power levels for an overhead channel.

Referring now to FIG. 8 and with further reference to FIGS. 5A-5B, operations relating to the use of optimization in transmit power on overhead channels to address jamming and negative geometries will be described in more detail. The present exemplary embodiment uses methods and apparatus to prevent jamming and negative geometries using optimized transmit power levels on overhead channels in unplanned base station deployments.

Generally, the transmit power gain of overhead channels and total transmit power of a femto node are chosen based on the desired range of a femto node. In order to allow access terminals to acquire a femto node in a location where the access terminal is being jammed by a neighbor femto node that restricts association, the overhead channels (e.g., common control channels such as pilot, synch and broadcast/paging) may be time multiplexed. Various numbers of time scales and methods for time multiplexing are contemplated. Furthermore, the overhead channels may be turned on only periodically, for example at the slot cycle index of the associated access terminals, so that the associated access terminals may receive paging messages. In a further configuration, a femto node may not transmit any signal at all.

However, during an active voice call or data transfer, there may be no idle periods that allow a neighbor femto node the opportunity to time multiplex the overhead channels jamming situations resulting from negative geometries. Accordingly, an exemplary embodiment describes a method for optimizing transmit power for overhead signals (e.g., pilot, synch and broadcast/paging channels) when there is an active call at a femto node and time multiplexing of overhead signals is not practical.

For example in 1xRTT and WCDMA networks, overhead channel (e.g., pilot, page, sych. channels) gain settings are adjusted for certain performance based on geometry and coverage constraints. Furthermore, femto node deployments exhibit some significant differences when compared to macro cell access node deployments. Various differences include:

1. Due to limited coverage size, maximum path loss values are much less in areas (e.g., cells) serviced by femto nodes compared to areas (e.g., cells) serviced by macro cell access nodes (e.g., 80 dB max path loss compared to 140 dB in a macrocellular deployment);
2. The number of simultaneously active access terminals are fewer in cells serviced by femto nodes than in cells serviced by macro cell access nodes (e.g., 1-2 users compared to 20-40 users);
3. As discussed above, due to the femto node restricted association requirements, negative geometries can be common for femto node deployments unlike for macro cell access node deployments.

These differences can result in very different optimal power settings for overhead channels for femto nodes 510. Since a femto node 510 generally will have few to no active access terminals 520, it would be desirable for the overhead channels to be maintained at a minimum power setting in order to minimize interference to neighboring cells serviced by femto nodes 510 and cells serviced by macro cell access nodes 560 (i.e., assuming co-channel operation). By way of example, one exemplary embodiment focuses on pilot channel optimization, however, the analysis can be applied to other overhead channels as well.

In the exemplary embodiment, an optimal traffic-to-pilot ("T2P") value for the case of a single voice call is determined as well as a default pilot power setting, $Ecp_{DEFAULT}$. When downlink (forward link) power control results in a modified ratio of traffic-to-pilot, the pilot power is adjusted so as to maintain the smallest value of total transmitted power and interference caused by the neighbor femto node.

By way of example, an access terminal 520A at the boundary of home femto node 510A and neighbor femto node 510B exhibits equal path loss to both femto nodes 510 and the neighbor femto node 520B is transmitting at full power thereby creating interference, Ior_max. In the present example, assuming the home femto node 510A is transmitting a pilot channel at a gain level, Ecp, then the pilot signal-to-noise ratio (SNR) can be written as: Ecp/Ior_max. According to the present exemplary embodiment, it is desirable to find the optimal Ecp setting that results in lowest total transmitted power from a home femto node 510A.

As represented by block 802, the pilot channel gain level Ecp is initialized to $Ecp_{DEFAULT}$. Thus, a default value of Ecp ($Ecp_{DEFAULT}$) can be determined based on a reasonable load and path loss differential values expected in femto networks.

As represented in block 804, a traffic call (e.g., voice call) is set up between the home femto 510A and an access terminal 520A with the power used on traffic channel denoted as Ect. In one exemplary embodiment, the Ect value is determined by the downlink (forward link) power control, as represented by query 806. Downlink (forward link FL) power control is used to maintain the required quality of service (e.g, packet error rate, PER). Downlink (forward link FL) power controls may either designate a decrease in Ect as represented by block 808, an increase in Ect as represented by block 810, or no change in Ect.

As represented in query 812, a determination of the packet error rate (PER) is used to identify adequate signal quality. Generally, if Ecp is very low, then channel estimation quality would degrade which will result in very large Ect. As Ecp increases, channel estimation will improve and the required Ect will go down. However, if Ecp is very large, then channel estimation quality will be higher than the required amount, which will not result any further reduction in Ect. Accordingly, when PER is inadequate, downlink (forward link FL) power control adjusts the Ect.

Since the interference generated to other femto nodes needs to be minimized, it would be desirable to have the optimal Ecp value that results in the minimum (Ect+Ecp). As represented by block 814, $Ecp_{OPTIMAL}$ is determined where:

$$Ecp_{OPTIMAL} = \mathop{\mathrm{argmin}}_{Ecp}[Ecp + f(Ecp)]$$

in other optimal Ecp value is found that minimizes total transmit power where Ect=$f$(Ecp)
(The function $f$(.) can be determined through offline simulations or tests.)
Then, as represented by block 816, the optimal Ect value is determined as:

$$ECt_{OPTIMAL} = f(Ecp_{OPTIMAL}).$$

As represented by block 818, the $T2P_{OPTIMAL}$ is determined as:

$$T2P_{OPTIMAL} = \frac{Ect_{OPTIMAL}}{Ecp_{OPTIMAL}}.$$

In another exemplary embodiment, simulations may be run to find the $Ecp_{OPTIMAL}$ and $ECt_{OPTIMAL}$ for typical channel types expected in cells of femto nodes using, for example, flat fading models, either Rayleigh or Rician, with low Doppler that can be tracked by power control. These optimal values depend, in one exemplary embodiment, on the particular path loss differential of the access terminal to neighbor femto node and the interference power received from the neighbor femto node (e.g., if the mobile terminal has 3 dB less path loss to neighbor femto compared to home femto, then the optimal Ecp and Ect values would need to increased by 3 dB).

On the other hand, in an alternate exemplary embodiment, if neighbor femto node is transmitting at half of Ior_max, then optimal Ecp and Ect values would need to be reduced by 3 dB. However, also note that it is not very practical to change Ecp values very frequently since it determines the handoff boundaries of the femto cell. Thus, as stated, a default value of Ecp ($Ecp_{DEFAULT}$) can be determined based on a reasonable load and path loss differential values expected in femto networks.

Figure 9:
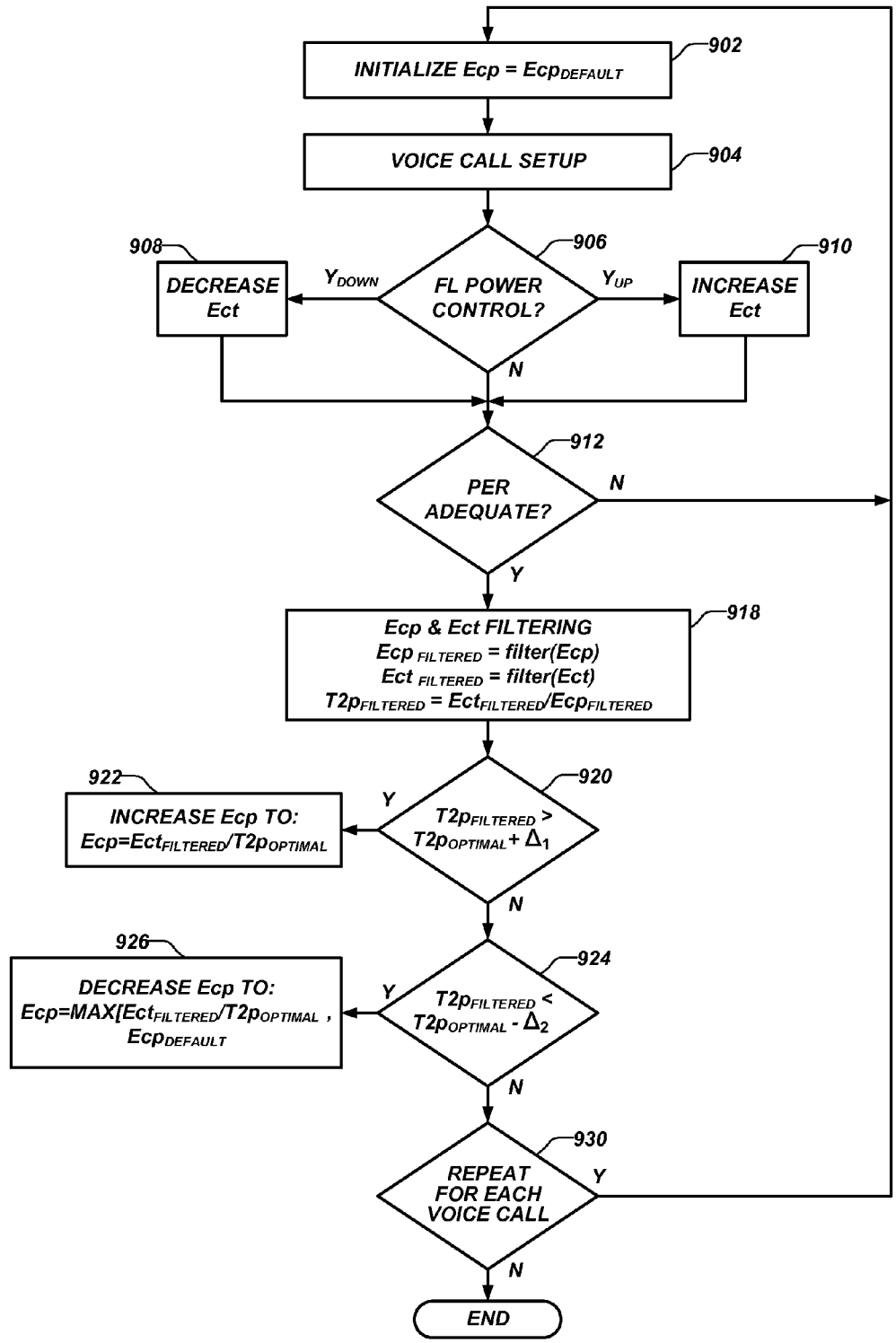
FIG. 9 is a flowchart of several sample aspects of operations that may be performed to manage interference through the use of optimized reduced power levels for an overhead channel.

Referring now to FIG. 9, to maintain optimal operation for cases with higher then expected load and path loss differential, in one exemplary embodiment, the following algorithm can be run for each of a plurality of calls occurring between a femto node and multiple associated access terminals.

As represented by block 902, the pilot channel gain level Ecp is initialized to $Ecp_{DEFAULT}$ for analysis of each voice call. Thus, a default value of Ecp ($Ecp_{DEFAULT}$) can be determined based on a reasonable load and path loss differential values expected in femto networks.

As represented in block 904, the process is repeated for each call set up between the home femto 510A and associated access terminals 520 with the power used on traffic channel denoted as Ect. In one exemplary embodiment, the Ect value is determined by the downlink (forward link FL) power control, as represented by query 906. Downlink (forward link FL) power control is used to maintain the required quality of service (e.g, packet error rate, PER). Downlink (forward link FL) power controls may either designate a decrease in Ect as represented by block 908, an increase in Ect as represented by block 910, or no change in Ect.

As represented in query 912, a determination of the packet error rate (PER) is used to identify adequate signal quality.

Accordingly, when PER is inadequate, downlink (forward link FL) power control adjusts the Ect.

As represented by block 918, the T2P$_{FILTERED}$ (e.g., Ect$_{FILTERED}$/Ecp$_{FILTERED}$) is monitored during the call. The purpose of filtering T2P would be to eliminate small scale fluctuations from the T2P calculation. E.g., a moving average filter can be used to filter Ect and Ecp values to compute Ect$_{FILTERED}$ and Ecp$_{FILTERED}$ respectively.

As represented in query 920, a determination is made as to the value of T2P$_{FILTERED}$. If T2P$_{FILTERED}$>T2P$_{OPTIMAL}$+$\Delta_1$, then as represented in block 922 Ecp is increased to $$Ecp = Ect_{FILTERED}/T2P_{OPTIMAL}.$$

As represented in query 924, a determination is made as the value of T2P$_{FILTERED}$. If T2P$_{FILTERED}$<T2P$_{OPTIMAL}$−$\Delta_2$, then as represented in block 926 Ecp is decreased to $$Ecp = \max[Ect_{FILTERED}/T2P_{OPTIMAL}, Ecp_{DEFAULT}].$$

T2P$_{OPTIMAL}$ depends on particular traffic configuration (rate, coding etc.). For example, if two users are performing voice calls with same rate vocoders, they would have same T2P$_{OPTIMAL}$. However if there is another user performing data transfer (e.g., 1xRTT data transfer at 153 kbps) it would require a different T2P$_{OPTIMAL}$. Once the T2P$_{OPTIMAL}$ is determined for given user (based on its traffic type), then the algorithm automatically adjusts Ecp. The above algorithm is specified for one user. If there are multiple users, then the algorithm may result in different Ecp values for each user. However, overhead channels are common to all users and we can only have one Ecp setting. Thus the algorithm could be generalized to a multiple users case. By way of example, an "optimal" Ecp$_i$ for each user (i=1, ..., N) in the system could be found as described above and then an actual Ecp could be decided as max(Ecp$_1$, ..., Ecp$_N$). Another option could be to find the optimal Ecp such that total power transmitted as overhead and traffic to all users is minimized. This would mean a modification of the calculation of box 814 to:

$$Ecp_{OPTIMAL} = \underset{Ecp}{\mathrm{argmin}}[Ecp + f_1(Ecp_1) + ... + f_N(Ecp_N)]$$

for users 1 to N in the femtocell. The purpose of filtering T2P would be to eliminate small scale fluctuations from the T2P calculation. E.g., a moving average filter can be used to filter Ect and Ecp values to compute Ect$_{FILTERED}$ and Ecp$_{FILTERED}$ respectively.

The optimal T2P may be obtained through simulations and once the T2P is decided, power control adjust Ect (which is part of standard 3 G operation) may be determined. Then the Ecp is adjusted to achieve/maintain optimal T2P. Specifically, two algorithms may run together: 1) the power control algorithm adjusting Ect and 2) the adjustment of Ecp described herein.

In the above algorithm, $\Delta_1$ and $\Delta_2$ are hystheresis parameters used to prevent fast fluctuations of Ecp. Furthermore, in order to prevent abrupt changes of Ecp equations above may be modified, in one exemplary embodiment, to let the Ecp correction to be performed more slowly. Lastly, other overhead channels (e.g., page, sych) can be adjusted based on the pilot power level (i.e., their relative power level with respect to pilot power level can be kept constant).

Accordingly, exemplary embodiments have been described for reducing transmit power for overhead signals (e.g., pilot, synch and broadcast/paging channels) when there is an active call at a femto node by determining an optimal overhead signal power level. The exemplary embodiment has been disclosed by way of example using in the pilot channel as the exemplary channel, however, the analysis can be applied to other overhead channels as well.

Figure 10:
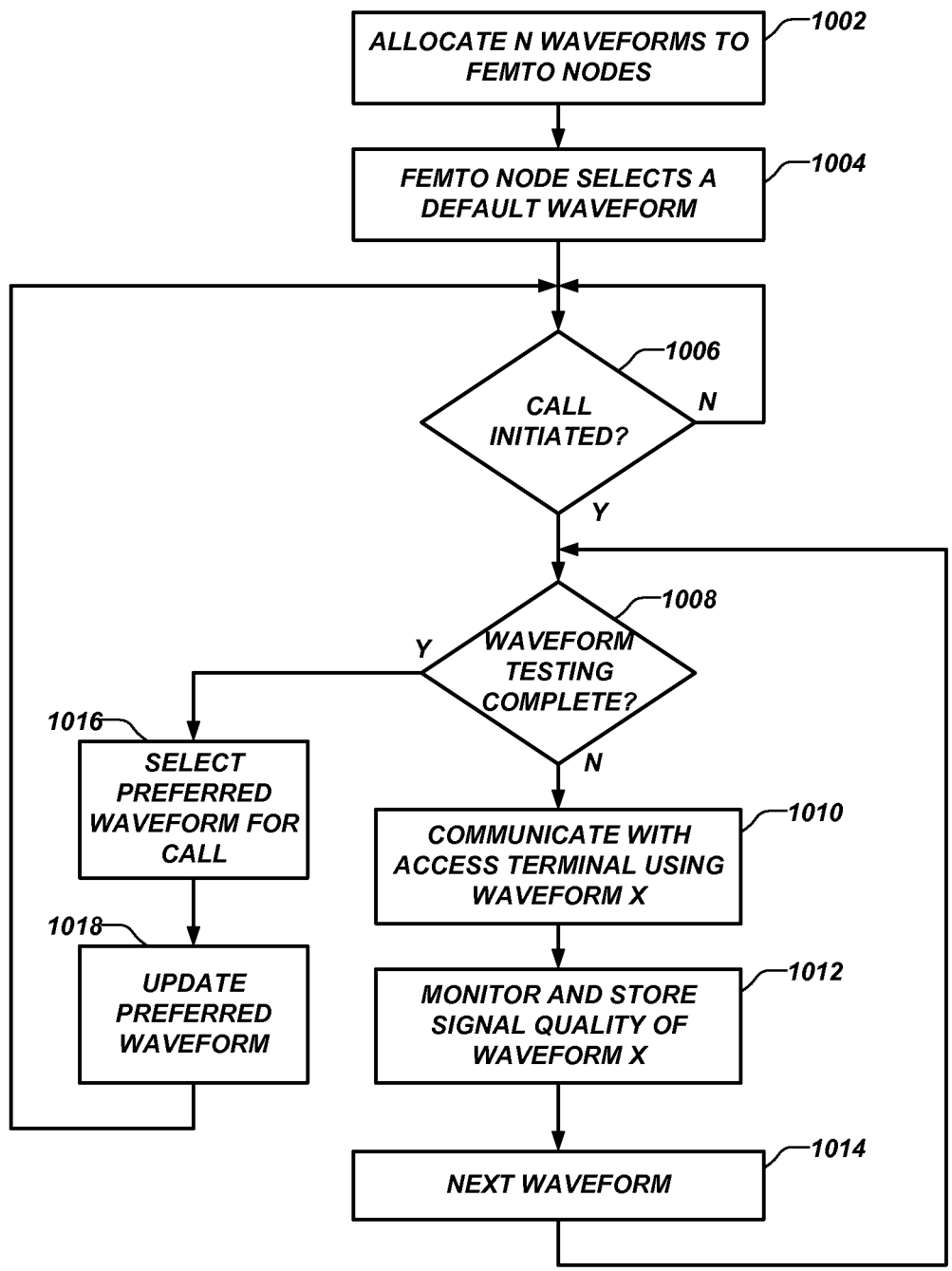
FIG. 10 is a flowchart of several aspects of operations that may be performed to manage interference through the use of frequency selective transmission to address jamming and negative geometries.

Referring now to FIG. 10 and with further reference to FIGS. 5A-5B, operations relating to the use of frequency selective transmission to address jamming and negative geometries will be described in more detail. As stated, due to unplanned deployment of femto nodes, the received SINR for an associated access terminal can become very low due to interference from a neighbor femto node transmission. This interference degrades control channel and traffic channel performance for the access terminal and may result in outages or decreased services. The exemplary embodiment disclosed herein addresses operations to improve the performance of an access terminal in a high interference area without the need to change legacy access terminals.

Generally, the exemplary embodiment introduces intentional frequency selectivity in downlink transmissions by orthogonalizing the transmit waveform among neighboring femto nodes to minimize interference. As an example, each femto node 510 selects transmit pulse shaping via channel sensing from available waveforms, for example, from three 3-tap channel waveforms, with each coefficient set from a given row of, for example, a 3×3 DFT matrix. In this case each for a given access point, the transmitted waveform would be filtered by a three tap FIR (in addition to normal baseband filtering) with filter impulse responses selected from one of the following three waveforms:

$$h_1[n] = \delta[n] + \delta[n-2] + \delta[n-4]$$

$$h_2[n] = \delta[n] + e^{j\frac{2\pi}{3}}\delta[n-2] + e^{-j\frac{2\pi}{3}}\delta[n-4] =$$
$$\delta[n] + (-0.5 + j0.866) \cdot \delta[n-2] + (-0.5 - j0.866) \cdot \delta[n-4]$$

$$h_3[n] = \delta[n] + e^{-j\frac{2\pi}{3}}\delta[n-2] + e^{j\frac{2\pi}{3}}\delta[n-4] ==$$
$$\delta[n] + (-0.5 - j0.866) \cdot \delta[n-2] + (-0.5 + j0.866) \cdot \delta[n-4]$$

where exp(jx)=cos(x)+j sin(x).

An alternative choice is two impulse responses with coefficient from 2×2 DFT (N=2). The choice of transmit filter stays for a certain period, after which the femto node 510 may make the selection again based on channel sensing.

With initial reference to FIG. 10, FIG. 10 describes method for interference management in a wireless communication system transmit waveform selection. As represented by block 1002, a set of N transmit waveforms are allocated to femto nodes 510 for use in downlink transmissions. In one exemplary embodiment, the channel waveforms may be formed from coefficients of an N-tap channel filter with each coefficient set being derived from a specific row in an N×N DFT matrix.

As represented by block 1004, a femto node 510 selects a default waveform upon initialization (e.g., power up) according to a defined selection process (e.g., randomization, randomly assigned by the network, etc.). The default waveform from the set of N transmit (downlink) waveforms. The default waveform is initially assigned as the preferred transmit waveform, TxWave$_{PREFERRED}$.

As represented by query 1006, the femto node 510 transmits on the downlink using the preferred transmit waveform when a call is initiated. Call setup with the associated access terminal 520 occurs and includes channel quality indications (e.g., Channel Quality Indicator CQI, Data Rate Control DRC) determined by the access terminal 520 and forwarded to the femto node 510 on the uplink.

As represented by query 1008, the femto node initiates a waveform testing cycle for a time period of T_test_waveform until all the possible waveforms have been tested. As represented by block 1010, the femto node 510 communicates with the associated access terminal 520 using the current waveform. The associated access terminal receives the downlink transmissions and generates a channel quality indication in response to the signal quality. The channel quality indication is forwarded in the uplink (reverse link) to the femto node 510.

As represented by block 1012, the femto node monitors the uplink to determine the channel quality using the current waveform based on the received channel quality indication. The femto node 510 may either form a table of waveforms and corresponding channel quality indications, or compare the current channel quality indication with any previous channel quality indications and retained an indication of the preferred waveform.

As represented by block 1014, the waveform testing increments to the next allocated waveform for continued evaluation. The exemplary waveform selection process iterates until the possible waveforms have been engaged for transmission on the downlink and the corresponding channel quality indication has been received on the uplink. As represented by block 1016, the preferred waveform based upon channel quality determination is then selected as the preferred transmit waveform which provides the best channel quality in the presence of interference from negative geometries associated with deployments of other unplanned base station deployments.

As represented by block 1018, the preferred waveform may be periodically updated based upon various factors including a specific time period, call termination, channel quality degradation threshold or other channel conditions know by those of ordinary skill in the art. Upon an update determination, processing returns to evaluate the channel quality of the various possible transmit waveforms.

The present exemplary embodiment manages interference from strong neighboring interference energy due to orthogonality of the Fourier series on the dominant signal energy during convolution, at the expense of creating self-noise through ISI and thereby limiting performance at high geometry. Further gains could be achieved with the use of MMSE equalizer due to different frequency coloring of impulse responses for the desired and interference signals. This mechanism is feasible in a femto node configuration as the delay spread is significantly smaller than one chip interval.

Figure 11A:
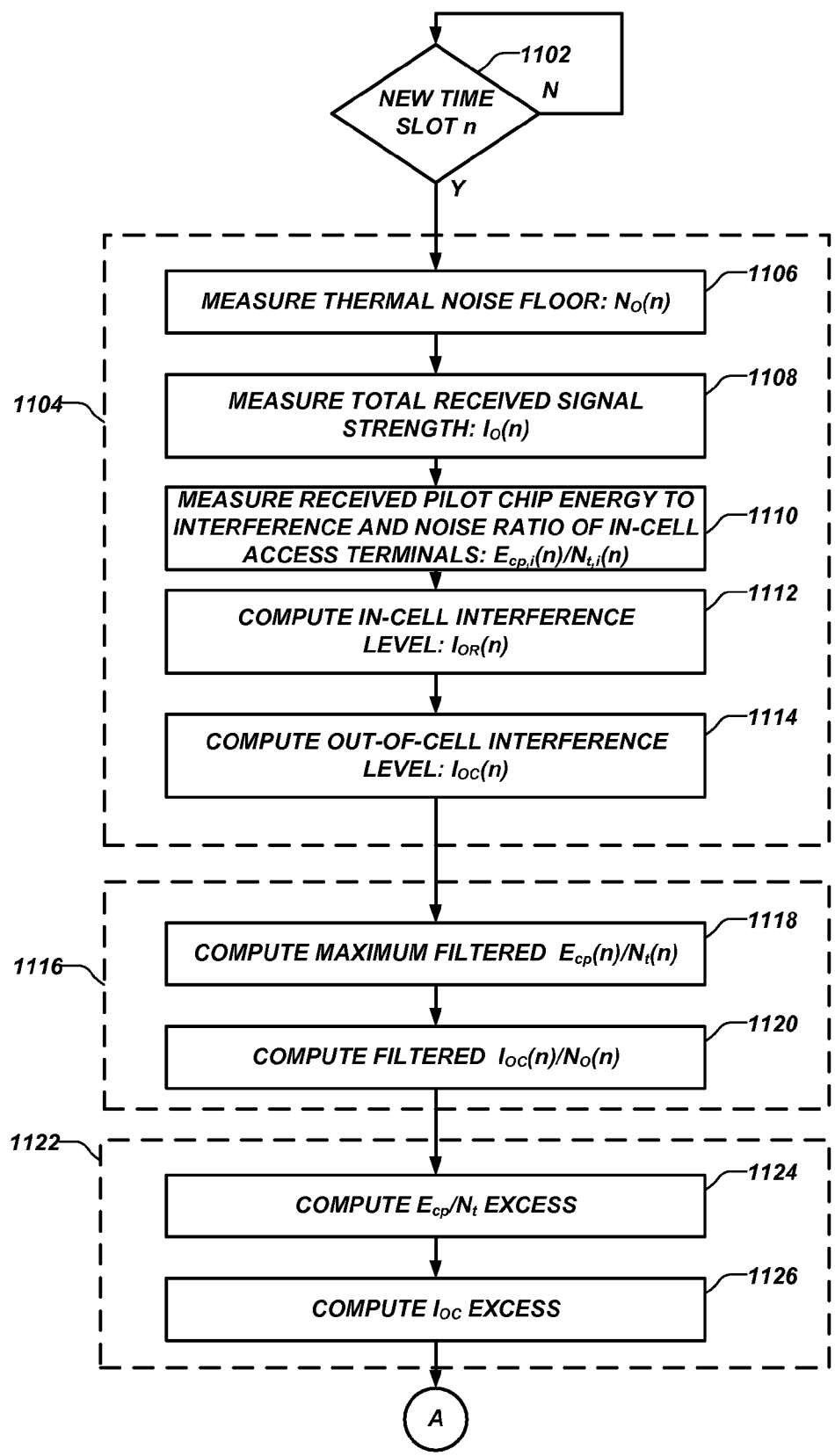
FIGS. 11A-11B are flowcharts of several aspects of operations that may be performed to manage interference through the use of adaptive noise figure and path loss adjustment.
Figure 11B:
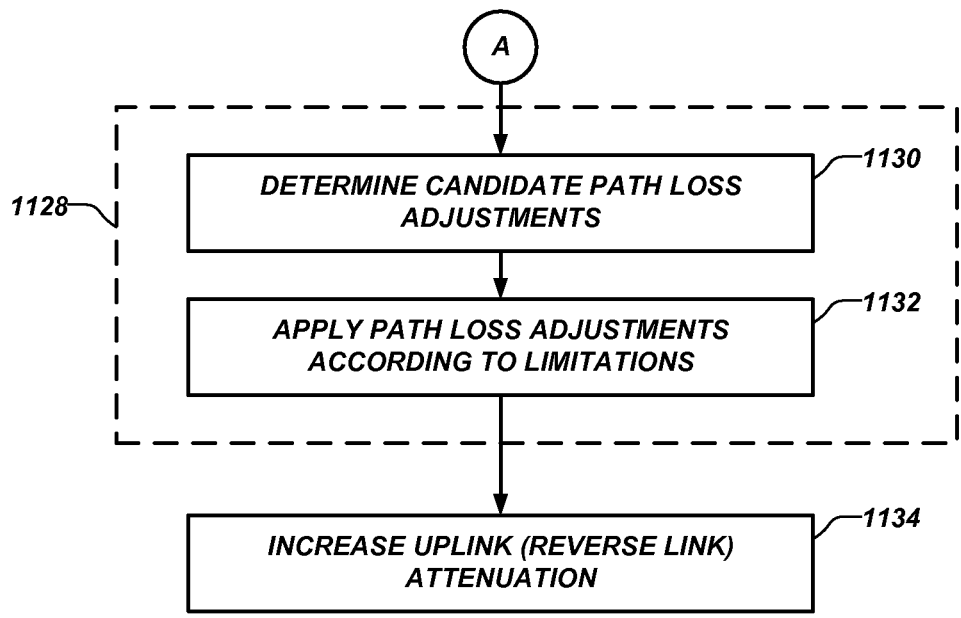

Referring now to FIGS. 11A-11B and with further reference to FIGS. 5A-5B, operations relating to the use of adaptive noise figure and path loss adjustment to address jamming and negative geometries will be described in more detail. The present exemplary embodiment uses methods and apparatus to prevent jamming and address jamming and negative geometries using adaptive noise figures and path loss adjustments.

Generally, femto nodes are connected to the Internet 540 and the mobile operator core network 550 via a wide band connection (e.g., DSL router or cable modem). Since the RF coverage of femto nodes 510 is not manually optimized by the mobile operator core network 550 and deployment is generally ad hoc, serious RF interference issues may arise unless appropriate interference mitigation methods are utilized.

In a macro cell network, access terminals 520 and macro cell access nodes 560 are designed to operate in a certain dynamic range. In cells formed by femto nodes 510, a home femto node 510 and an associated access terminal 520 may be arbitrarily spatially nearby, thus creating very high signal levels beyond the sensitivity range of the respective receivers. On a downlink (forward link FL), such a configuration can saturate the receiver of associated access terminal and create degraded demodulation performance. On the reverse link, such a configuration can create very high noise rise (RoT), also known to create instability at the home femto node 510. Thus maximum and minimum transmit power levels and receiver noise figure values need to be adjusted accordingly for home femto nodes 510. This situation is illustrate in FIG. 5B with reference to home femto node 510A and associated access terminal 520A.

Femto nodes 510B can cause interference both on the uplink UL (reverse link RL)) and in the downlink DL (forward link FL) of cells serviced by macro cell access nodes 560. For example a femto node 510B installed, for example, near a window of a residence 530B can cause significant downlink DL interference to the access terminals 520F outside the house (i.e., non-associated access terminal) that are not served by the femto node 510B. Also, on the uplink UL, the associated access terminals 520 that are served by a specific home femto node 510 can cause significant interference on the macro cell access nodes 560.

On the uplink UL, non-associated access terminals 520F that are served by the macro cell access nodes 560 can cause significant interference on the home femto node 510A.

As stated, femto nodes 510 can also create significant interference to each other due to unplanned deployment. For example in nearby residences 530, a femto node 510 installed near a wall separating two residences 530 can cause significant interference to a neighboring femto node 510 in an adjacent residence 530. In such a case, the strongest signal (in terms of RF signal strength) from a femto node 510 to an access terminal 520 may not necessarily be the associated access terminal's home femto node due to restricted association requirement described above. Such a scenario is illustrated in FIG. 5B where on the downlink DL, femto node 510A may cause significant interference (e.g., low SINR) to access terminal 520D. Also, on the uplink UL, non-associated access terminal 520D may cause significant interference (e.g., high RoT) to foreign (alien) femto node 510A.

For example, on the uplink of CDMA wireless networks, system stability and load is usually determined by the metric: rise over thermal (RoT), also know as noise rise, at the femto node. Rise over thermal (RoT) indicates the ratio between the total power received from all sources at the femto node and the thermal noise:

$$RoT = (Ioc + Ior + No)/No,$$

where
- Ior: Total received power received at the femto node from all wireless devices for whom femto node is in their active set
- Ioc: Total received power received at the femto node from all wireless devices for whom femto node is not in their active set
- No: Variance of the thermal noise including the femto node noise figure (NF).

For stable system operation on the uplink UL, RoT needs to be controlled. Typically, RoT is controlled to be around 5 dB and higher. High RoT values can cause significant performance degradation. For example, in FIG. 5B for the two neighboring cells formed by femto nodes 510A and 510B, high RoT caused by access terminal 520D at femto node 510A results in performance degradation for associated access terminal 520C. One specific interfering scenario occurs when neighbor access terminal 520D has bursty uplink UL traffic and exhibits overly high power levels (e.g., in close proximity) at femto node 510A. Accordingly, during high rate data uplink UL bursts from access terminal 520D, the RoT at femto node 510A goes above 20 dB. Furthermore, the uplink UL power control mechanism in CDMA systems (e.g., CDMA2000, WCDMA, 1xEV-DO) is design to combat this type of interference scenarios. However due to excessive variation in RoT, the mechanism may take some time for femto node 510A to power control associated access terminal 520C to overcome the interference caused by non-associated access terminal 520D. Meanwhile the signal-to-interference ratio (SIR) of associated access terminal 520C falls below required levels resulting in consecutive packet errors on the uplink UL from associated access terminal 520C to home femto node 510A.

To minimize the sudden drop in SIR in the described scenario, one alternative could be to increase the power control step size on the uplink UL as conveyed from home femto node 510A to associated access terminal 520C. However, there are usually upper limits on the power control step size imposed by the communication standards since other system degradations occur when a system operates at very high power control step size. Thus it is desirable to control the RoT level at the femto node 510.

In order to prevent an abrupt jump in RoT due to sudden increase in interference created by non-associated access terminals (e.g., interference created by non-associated access terminal 520D at femto node 510A), the noise figure NF can be increased or the received signal can be attenuated by adding some path loss (PL) component on the uplink UL. However, such an operation is performed at the femto node experiencing high levels of interference. For example, in the scenario shown in FIG. 5B, if both femto node 510A and femto node 510B increase the noise figure NF or attenuation by the same amount, the result is larger uplink UL transmit power levels for both access terminals 520C and access terminal 520D. As a result, the high RoT problem occurring at femto node 510A is not remedied.

According to an exemplary embodiment, the femto node exhibiting high RoT, femto node 510A in the present scenario, increases its noise figure NF or attenuation level while femto nodes not exhibiting high RoT, femto node 510B in the present scenario, keep their noise figures NFs constant as long as they are not experiencing high levels of out-of-cell interference. Thus, a method is provided to adjust the noise figure NF or attenuation when there is high level of out-of-cell interference at a particular femto node. According to an exemplary embodiment for managing interference in a wireless communication system, RoT at a given time slot n can be expressed as:

$$RoT(n) = [Ioc(n) + Ior(n) + No(n)] / No(n)$$

and $$Ior(n) = \sum_{i \in InCell} Ec_i(n)$$

where $Ec_i$ is the total received energy per user i.

With initial reference to FIGS. 11A-11B, FIGS. 11A-11B describe a method for interference management in a wireless communication system using adaptive noise figure and path loss adjustment to adaptively adjust path loss for controlling RoT. It is noted that the adjustment factor can be applied either to uplink UL attenuation or the noise figure NF of the femto node.

As represented by query 1104, the operations described herein may occur periodically, such as upon the occurrence of a subsequent time slot n. By way of example, at every slot n, the femto node 510 may perform the following method to provide interference management to a communication system. As represented by block 1104, various signals are measured and levels are computed. Specifically as represented by block 1106, a thermal noise figure: No(n) is measured at the femto node 510. The thermal noise figure No(n) is the variance of the thermal noise including the femto node noise figure (NF).

As represented by block 1108, a total received signal strength Io(n) is measured. The total received signal strength Io(n) is the total received power received at the femto node from all wireless devices for whom femto node is in their active set and from all wireless devices for whom femto node is not in their active set. As represented by block 1112, the in-cell (associated access terminal) interference level Ior, which is the total received power received at the femto node from all wireless devices for whom femto node is in their active set, is computed. The computed in-cell interference level can be expressed as:

$$Ior(n) = \sum_{i \in InCell} Ec_i(n)$$

As represented by block 1110, a received pilot chip energy Ecp(n) to interference and noise Nt(n) ratio is measured from all wireless devices for whom the femto node is in their active set.

As represented by block 1114, the out-of-cell (non-associated access terminal) interference level Ioc, which is the total received power received at the femto node from all wireless devices for whom femto node is not in their active set, is computed. The computed out-of-cell interference level can be expressed as:

$$Ioc(n) = Io(n) - Ior(n) - No(n)$$

As represented by block 1116 the received out-of-cell interference level to the thermal noise figure No(n) ratio and maximum filtered received pilot chip energy Ecp(n) to interference plus noise Nt(n) ratio among in-cell access terminals are computed. As represented by block 1118, the access terminal signal-to-noise ratio measured as the received pilot chip energy Ecp(n) to interference and noise Nt(n) ratio for all in-cell access terminals are filtered, by way of example, according to infinite impulse response (IIR) filtering in the dB domain. The maximum filtered value among access terminals for whom the femto node is in their active set can be expressed as:

$$\max\left(\overline{\frac{Ecp(n)}{Nt(n)}}\right) = \max_{i \in in-cell\ access\ terminals}\left[\text{filter}\left(\frac{Ecp_i(n)}{Nt_i(n)}\right)\right]$$

As represented by block 1120, the signal-to-noise ratio of the out-of-cell received interference level Ioc and the thermal noise figure No(n) are computed. The signal-to-noise ratio is also further filtered, by way of example, according to finite impulse response (FIR) filtering in the dB domain. The computed out-of-cell (non-associated access terminal) signal-to-noise ratio can be expressed as:

$$\overline{\left(\frac{Ioc(n)}{No(n)}\right)} = \text{filter}\left(\frac{Ioc(n)}{No(n)}\right)$$

As represented by block 1122, the excessive received out-of-cell interference beyond the allowed (target) amount with which the communication system can reliably operate and the maximum excessive received pilot chip energy to interference and noise ratio among in-cell access terminals are determined. As represented by block 1124, the excess amount for received pilot chip energy to interference and noise ratio can be expressed as:

$$\text{EcpNt\_excess} = \max\left(\overline{\frac{Ecp(n)}{Nt(n)}}\right) - \text{EcpNt\_target}$$

with the above allowed threshold Ioc_target having the units of dB.

As represented by block 1126, the excess amount of the out-of-cell received interference level Ioc_excess can be expressed as:

$$\text{Ioc\_excess} = \overline{\left(\frac{Ioc(n)}{No(n)}\right)} - \text{Ioc\_target}$$

with the above allowed threshold Ioc_target having the units of dB.

As represented in block 1128, an amount of additional path loss (PL_adjust) that needs to be applied is computed. As represented in block 1130, the candidate path loss adjustments are determined. The candidate adjustments can be expressed as:

$$\text{PL\_cand}_1 = \text{Ior\_excess}$$

$$\text{PL\_cand}_2 = \begin{cases} 0, & 0 \geq \text{EcpNt\_excess} \\ \text{EcpNtbased\_PL\_step}, & 0 < \text{EcpNt\_excess} \end{cases}$$

$$\text{PL\_cand}_3 = \text{PL\_cand}(n-1) - \text{PL\_step\_down}$$

$$\text{PL\_cand} = \max(\text{PL\_cand}_1, \text{PL\_cand}_2, \text{PL\_cand}_3)$$

Regarding determining the candidate adjustment values, the candidate values may be based upon various characteristics or rules. By way of example, various points can be expressed as:
(1) PL_cand$_1$ and PL_cand$_2$ are designed to quickly adjust the PL based on high Ecp/Nt or Ioc values exceeding a high threshold.
(2) In case both Ecp/Nt and Ioc are below allowed limits, PL_cand$_3$ is designed to slowly reduce (decay) PL such that it won't be unnecessarily high.
(3) If there is only one active user in the cell there maybe no reason to directly limit Ioc since RoT control mechanisms already can control the RoT level. So in the case when there is only one active user in the system, Ioc_target can be set to a very large value.

As represented in block 1132, the appropriate path loss (PL_adjust) can be applied according to the upper and lower path loss PL adjustment limitations expressed as:

If (*PL_cand*>*PL_adjust*_max)

*PL_adjust*(*n*)=*PL_adjust*_max elseif(*PL_cand*>0)

*PL_adjust*(*n*)=*PL_cand* elseif(*PL_cand*≤0)

*PL_adjust*(*n*)=0

As represented in block 1134, the uplink UL attenuation (or noise figure) is increased by PL_adjust(n). It is noted that in an actual implementation, hardware limitations may require quantization of PL_adjust(n) to the closest possible setting.

Figure 12:
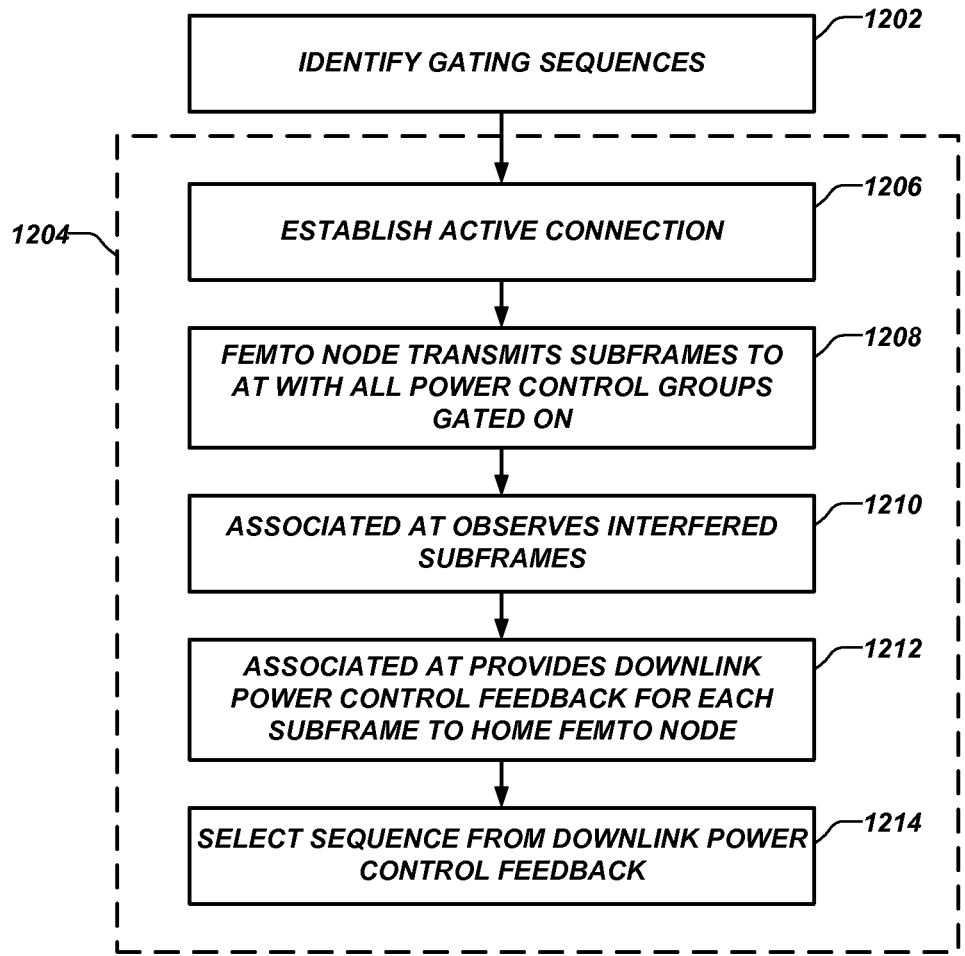
FIG. 12 is a flowchart of several aspects of operations that may be performed to manage interference through the use of subframe time reuse techniques.

Referring now to FIG. 12 and with further reference to FIGS. 5A-5B, operations relating to the use of subframe time reuse to address jamming and negative geometries will be described in more detail. The present exemplary embodiment uses methods and apparatus to prevent jamming and address jamming and negative geometries using subframe time reuse.

In one exemplary embodiment, if an air interface permits time division multiplexing, transmissions can be scheduled in such a manner as to eliminate time periods with negative geometries. Thus, femto node 510B may communicate with associated access terminal 520D during a period that femto node 510A is silent. Similarly, associated access terminal 520C may communicate with femto node 510A during a period where non-associated access terminal 520D is scheduled by femto node 510A to be silent. Such methods of synchronization and scheduling approaches find application to systems that permit time division scheduling, such as 1xEVDO. By way of example, since the 1xEVDO control channels are time multiplexed, neighbor femto nodes 510 can be organized to use time re-use of these control channels.

However, as discussed next, this does not work with air interface technologies that do not permit operation with scheduling and time division multiplexing, for example, technologies that use CDM control channels, including, for example, 1xRTT, WCDMA and HSPA. Design details for sub-frame time reuse are described in detail in embodiments below.

In one exemplary embodiment, sub-frame time reuse is applicable to technologies where hybrid time reuse cannot be applied. In many cellular technologies such as cdma2000 and WCDMA, the base station transmits a continuous pilot and other CDM control channels (e.g., synch, paging and broadcast, etc.) which the access terminals use for a variety of purposes, including initial scanning and acquisition, idle mode tracking and channel estimation. This continuous transmission of pilot and overhead channels from femto nodes may result in the above described downlink jamming, even when there is no active traffic at the jammer.

In one exemplary embodiment, the first step is to address the outage situations when the desired femto node 510 pilot and overhead channels (e.g., synch and paging) cannot be received at the access terminal 520. By way of example, a cdma2000 frame is divided into sixteen power control groups (PCGs). To permit acquisition of the pilot signal, a fraction of the pilot and overhead channel transmission is gated off.

With reference to FIG. 5B, femto node 510A, transmitting to associated access terminals 520A-C, transmits such gated frames (i.e., during gated off periods no FL traffic is transmitted). At non-associated access terminal 520D, the carrier-to-interference ratio, C/I, for transmissions from femto node 510B improves dramatically during the period that femto node 510A is gated off, permitting acquisition of the pilot and synch channels from femto node 510B at access terminal 520D, in spite of the highly negative geometry at access terminal 520D.

In one exemplary embodiment, these gated on-off periods are scheduled to be non-overlapping. Thus, femto node 510A and femto node 510B can use non-overlapping sub-frames (or power-control groups). In one exemplary embodiment, by gating off (i.e., not transmitting any FL traffic) a fraction ½, ⅔ or ¾ of the sub-frames, for example, a time division reuse pattern of 2, 3 or 4 may be created. If the pilot and overhead channels have sufficient redundancy, for pilot acquisition as well as decoding of the overhead channels, this would have an impact of 3-6 dB, for example, on the link budget of the pilot and overhead channels. However, this can be easily compensated by increasing the transmit power of the femto node 510, since in the femto node 510 deployment, the arrangements are not limited by transmit power.

In addition to the pilot and overhead channels, the same gating method may also be applied to the voice or data channel transmissions. In one exemplary embodiment, the femto node 510 gates a fraction of each frame transmission off. If, for example, the fraction (e.g., ½) that is turned off is lesser than the channel coding rate used for that transmission, for example, in cdma2000 forward link voice packet transmissions, a particular standard format (RC3) uses a rate ¼ convolutional code, the access terminal 520 will be able to decode the packet, even though half of the packet transmission was gated off. To avoid the necessity of knowing these geometries and scheduling these non-overlapping gated off times, the following method is disclosed to prevent jamming and address jamming and negative geometries using sub-frame time reuse.

With initial reference to FIG. 12, FIG. 12 describes an exemplary embodiment for interference management in a wireless communication system using subframe time reuse. As represented by block 1202, gating sequences (or patterns) are identified with each gating sequence gating-off, for example, either eleven of sixteen power control groups (PCGs) to obtain a reuse of 5/16, or eight of sixteen PCGs to obtain a reuse of 2.

The gating sequence may be chosen in such a way as to minimize the cross-correlation between pairs of gating sequences from potentially interfering femto nodes 510. As represented by block 1204, each femto node 510 selects one of the gating sequences. Although the femto node 510 may attempt to choose a gating sequence that is non-overlapping with neighbor femto nodes, general selection does not necessarily result in a non-overlapping arrangement. However, the exemplary embodiment provides a mechanism such that a non-overlapping gating sequence can be identified and selected.

As represented by block 1206, an access terminal 520 establishes an active connection with a femto node 510. In response to establishing the connection, the access terminal 520 provides a "fast" per-subframe downlink (forward link) power control feedback allowing the femto node 5101 to select a desired non-overlapping gating sequence.

Specifically and as represented in block 1208, femto node 510B transmits a series of frames on, for example, a data/voice channel to the access terminal 520D with all power control groups (PCGs) gated on. As represented by block 1210, since a potentially interfering neighbor femto node 530A is already engaged in communication with access terminals 520A-C using sub-frame gating techniques, access terminal 520D will observe interference on a subset of the subframes in response to gated transmissions by interfering neighbor femto node 510A. Furthermore, access terminal 520D will also observe another subset of subframes where no interference from neighbor femto node 520A is observed when neighbor femto node 510A is gated off during that subset of subframes.

During the subframes in which femto node 510A is gated on, the access terminal 520D will observe, for example, low Eb/No. As represented by block 1212, the downlink (forward link) power control feedback from access terminal 520D will indicate that femto node 510B should increase the transmit power for specific subframes. Similarly, during the subframes that femto node 510A is gated off, access terminal 520D will observe high Eb/No and the downlink (forward link) power control feedback from access terminal 520D will indicate that femto node 510B should decrease the transmit power for specific subframes.

As represented by block 1214, the sub-frame downlink (forward link) power control feedback provided by access terminal 520D to femto node 510B indicates which subframes at transmitted by interfering neighbor femto node 510A are gated on and which are gated off. Accordingly, such an indication allows femto node 510B to select a gating sequence (pattern) that is non-overlapping (complementary) with the gating sequence (pattern) chosen and in use by interfering neighbor femto node 510A. The exemplary embodiment finds application for the gating sequence (pattern) chosen by interfering neighboring femto node 510A.

Depending on the implementation technology, other considerations may further determine the types of gating sequences (patterns) best suited for this sub-frame gating technique. Furthermore, since legacy access terminals are unaware of the gating being done on the downlink (forward link), other considerations may be applied to include choosing gating sequences (patterns) that intersperse shortened "off" periods between shortened "on" periods. Such a consideration may reduce impact on downlink (forward link) channel estimation and channel quality feedback estimation methods in use by the legacy access terminal. Thus, for example, in a case when eight sub-frames out of sixteen are gated off, there may be beneficial reasons for selecting alternating sub-frames to be gated off and gated on.

In another exemplary embodiment, gating sequence selection may apply different considerations for deployments where neighbor femto nodes 510 are not synchronized. Such considerations may exist, for example, when WCDMA femto nodes 510 are not synchronized. In one exemplary embodiment of non-synchronized femto nodes 510, instead of alternate on-off gated subframes, it may be beneficial to have all or many of the gated-off subframes be contiguous, as well as all or many of the gated-on subframes. For example, in the case of a WCDMA system with fifteen subframes over 10 ms, or thirty subframes over 20 ms, a beneficial method may be for each femto node 510 to gate off nine contiguous of the fifteen subframes and gate on six contiguous subframes. Alternately, using a 20 ms frame, the femto node 510 may gate off sixteen contiguous subframes and gate on fourteen contiguous subframes out of thirty subframes.

In alternate exemplary embodiments, other methods to address this situation and improve downlink C/I involve femto nodes 510 configured to gate-off pilot and overhead channel transmissions when there are no access terminals associated, and to turn on pilot and overhead channels periodically and/or at very low power only at times when associated access terminals 520 are expected to be scanning for the femto node 510.

Figure 13:
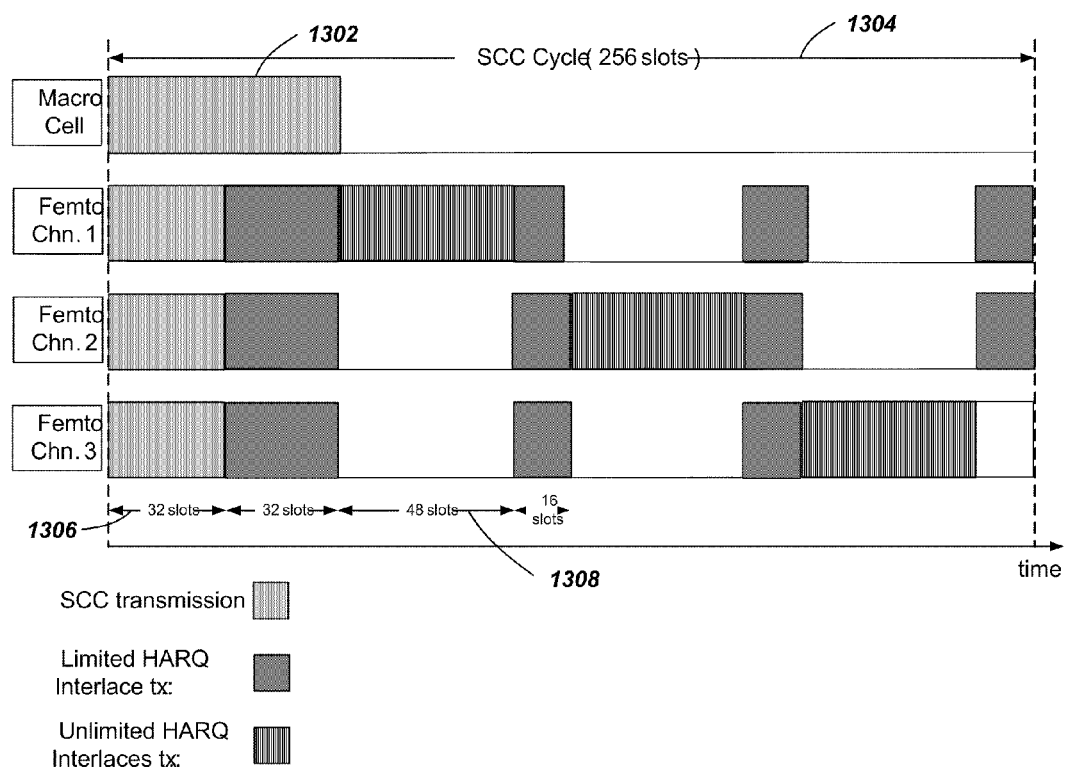
FIG. 13 is a slot diagram illustrating time sharing among femto nodes that may be performed to manage interference through the use of hybrid time reuse techniques.
Figure 14:
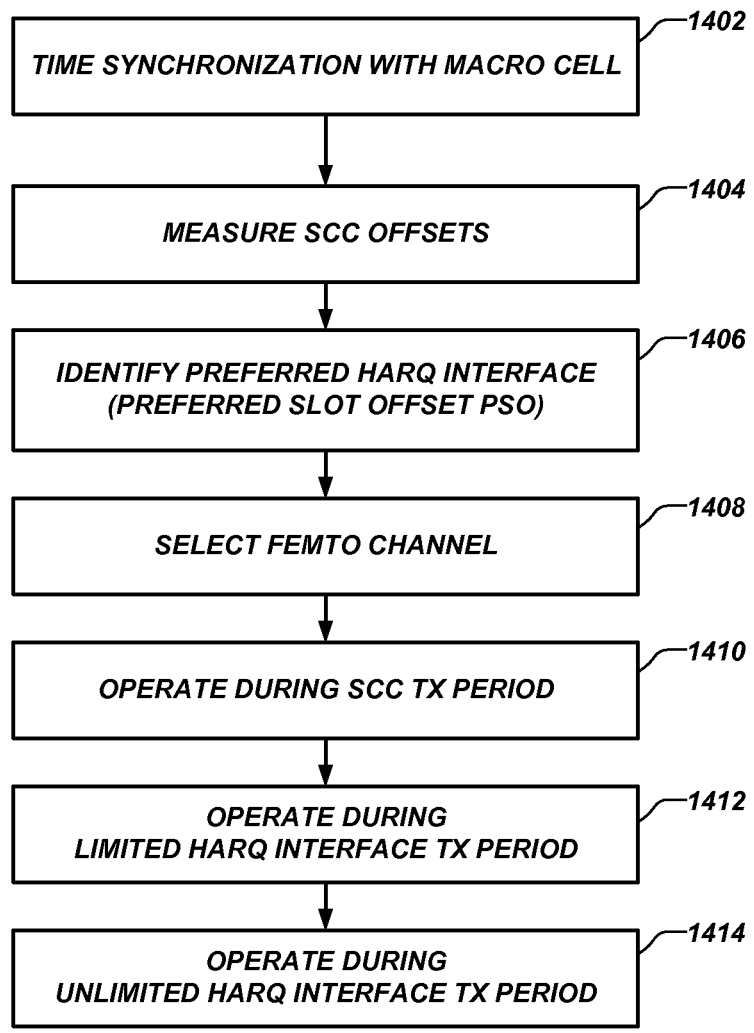
FIG. 14 is a flowchart of several aspects of operations that may be performed to manage interference through the use of hybrid time reuse.

Referring now to FIGS. 13-14 and with further reference to FIGS. 5A-5B, operations relating to the use of hybrid time reuse to address jamming and negative geometries will be described in more detail. The present exemplary embodiment uses methods and apparatus to prevent jamming and address jamming and negative geometries using hybrid time reuse techniques.

In an exemplary embodiment, if an air interface permits time division multiplexing (such as 1xEV-DO), then transmissions may be scheduled in such a manner as to eliminate time periods with negative geometries. Thus, femto node 510B can communicate with associated access terminal 520D during a period when femto node 510A is not transmitting. Similarly, associated access terminal 520C may communicate with femto node 510A during a period where access terminal 520D is scheduled by femto node 510B to not transmit.

In an exemplary embodiment of a hybrid time reuse method, a downlink DL transmission is divided into three separate groups in time:
1. Synchronous Control Channel (SCC) transmission period
2. Limited HARQ Interlace Tx. Period
3. Unlimited HARQ Interlace Tx. Period FIG. 13 illustrates an exemplary downlink DL timeline including three different time periods during each synchronous control channel (SCC) cycle period of 256 time slots. In one exemplary embodiment based on time sharing of the resources during "unlimited HARQ interlace," there are three different femto channels defined. As described in more detail later, it is desired that neighboring femto nodes 510 pick different femto channels so that they do not experience interference from other neighbor femto nodes 510 (i.e., each femto node selects a primary femto channel different than the neighbor femto node 510). If there is no interference from a neighbor femto node, multiple femto channels (in addition to the primary femto channel) can be used by one femto node 510. Details of one exemplary embodiment of a hybrid time reuse operation is described below.

With initial reference to FIG. 14, FIG. 14 describes a method for interference management in a wireless communication system using hybrid time reuse, in accordance with an exemplary embodiment. As represented by block 1402, at the initial power up or other synchronization of a femto node 510, the femto node 510 performs time synchronization with the macro cell network (e.g., macro cell access node 560). As represented by block 1404, during time synchronization with the macro cell access node 560, the femto node 510 measures secondary synchronization channel (SCC) offsets (MSCCO) used by the macro cell access node 560 and neighboring femto nodes 510. Based on the measurement, the femto node 510 identifies a preferred HARQ interlace with the least interference, as represented by block 1406. A preferred slot offset (PSO) is defined from the identified preferred HARQ interlace.

As represented in block 1408, a primary femto channel is selected. By way of example, on exemplary selection process may follow the following algorithm:
 If mod(PSO-MSCCO,4)=1 then Femto Chn. 1 is picked as primary Femto Channel
 If mod(PSO-MSCCO,4)=2 then Femto Chn. 2 is picked as primary Femto Channel
 If mod(PSO-MSCCO,4)=3 then Femto Chn. 3 is picked as primary Femto Channel
where Chn1, Chn2 and Chn3 are described in FIG. 13.

Once femto channels are determined, femto nodes 510 may transmit traffic in the downlink (forward link). Transmissions by femto nodes 510 are timed to reduce interference with macro cell transmissions and other femto node transmissions. A femto node transmission protocol for the various macro cell transmission periods, SCC transmission period, limited HARQ interlace transmission period, and unlimited HARQ interlace transmission period, are described below.

As represented in block 1410 and with reference to FIG. 13, an SCC transmission period 1302 is defined at the beginning of each SCC cycle 1304 (e.g., 256 slots) to allow transmission of an SCC offset (e.g., first 32 slots of every SCC cycle). In one exemplary embodiment, two sub-periods 1306, 1308 are defined based on HARQ interlace: preferred slot offset and non-preferred slot offset.

On HARQ interlace with the preferred slot offset (PSO), femto node 510 transmits SCC information. This allows reliable transmission of control channel information and enables associated access terminals 520 to hand-in and hand-out from femto node 510. During HARQ interlaces on non preferred slot offsets, femto nodes 510 do not transmit any downlink (forward link) traffic (DTX FL transmission) so that minimum interference is caused to neighbor macro cells and neighbor femto node SCC transmission. On these slot offsets, a fractional of downlink DL power is used for Pilot and MAC channels so that these channels can operate successfully.

As represented in block 1412 and with reference to FIG. 13, during a limited HARQ interlace transmission period, the femto node 510 is allowed to transmit downlink (forward link) traffic on the HARQ interlace of PSO and delay sensitive traffic is given absolute priority over best effort traffic. With reference to FIG. 13, limited HARQ interlace transmission period gives a transmission opportunity for each femto node so that delay sensitive traffic (such as VoIP etc.) does not suffer too excessive delay. In one example, during limited HARQ interlace transmission period, if requested DRC is null, then single user packet type of 38.4 kbps may be used. If DRC is null or erased, then compatible packet types such as single user packet (SUP) 38.4 kbps or multi user packet (MUP) of 256/512/1024 bits may be utilized (similar to DRC erasure mapping).

In one exemplary embodiment, downlink (forward link) traffic may also be transmitted on HARQ interlace of MSCCO. In one embodiment, neighboring femto nodes 510 may use this interlace as well (i.e., no protection against interference). During HARQ interlaces of other slot offsets, femto nodes do not transmit any downlink (forward link) traffic (time re-use) however a fraction of downlink (forward link) power can be allocated to pilot and MAC channels for successful operation of these channels.

As represented in block 1414 and with reference to FIG. 13, during an unlimited HARQ interlace transmission period, the femto node 510 is allowed to transmit downlink (forward link) traffic on all of the four HARQ interlaces. At the beginning of the period, downlink (forward link) transmit power can be ramped up slowly to let the access terminal rate predictor to ramp up. In one exemplary embodiment, to further increase the ramp-up of DRC values, DRC length of 1 slot should be used. Due to conservative predictor behavior, if null DRC is requested by the mobile at the beginning of unlimited HARQ interlace transmission period, femto node 510 can transmit compatible packet types (multi use packet or 38.4 kbps single user packet). Also, femto node downlink (forward link) scheduler can keep track of previously requested DRC values and maintain DRC values from last transmission periods and HARQ early termination statistics to decide on what data rates can be decoded by access terminal 520.

Figure 15:
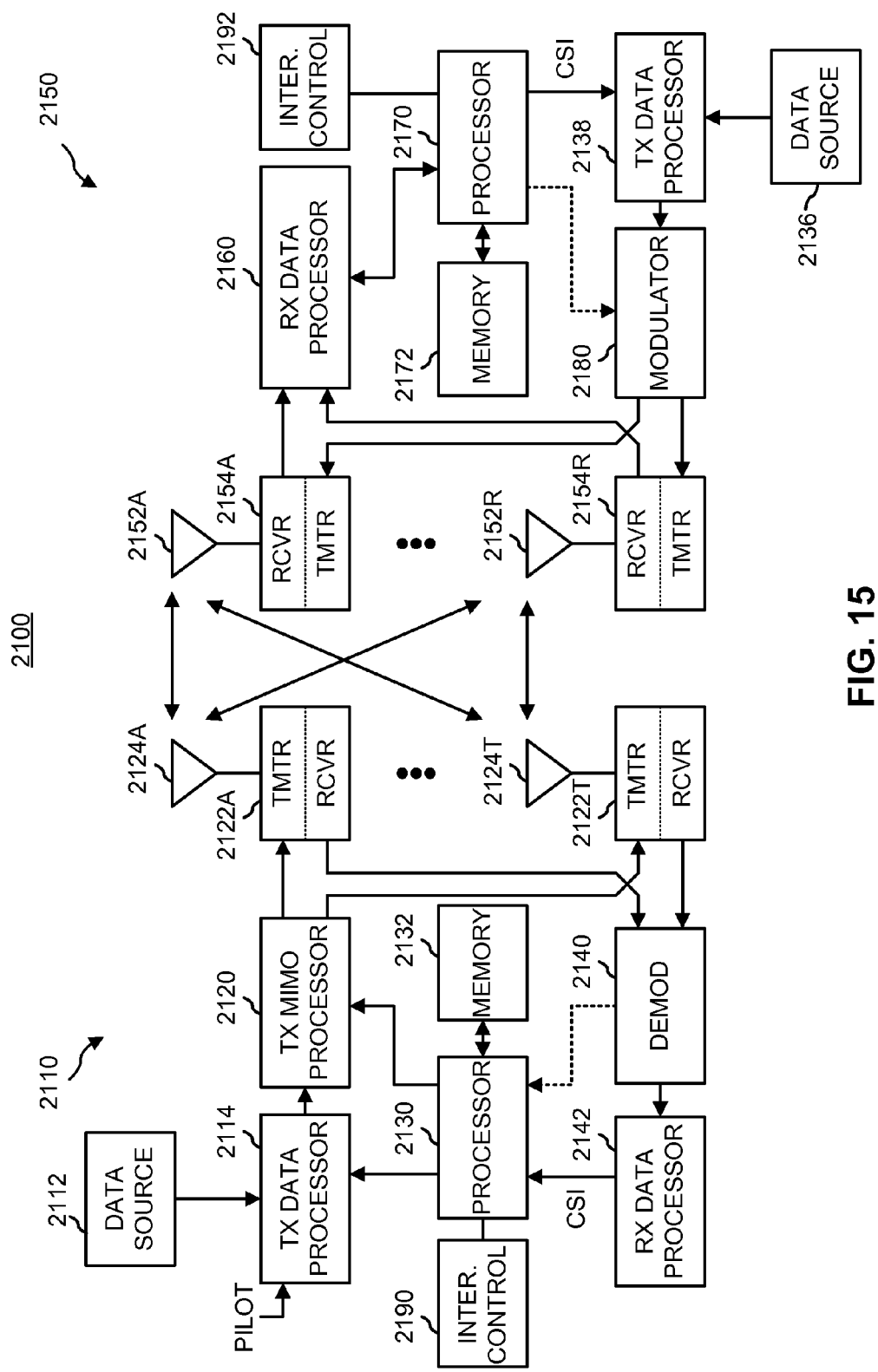
FIG. 15 is a simplified block diagram of several sample aspects of communication components.
Figure 16:
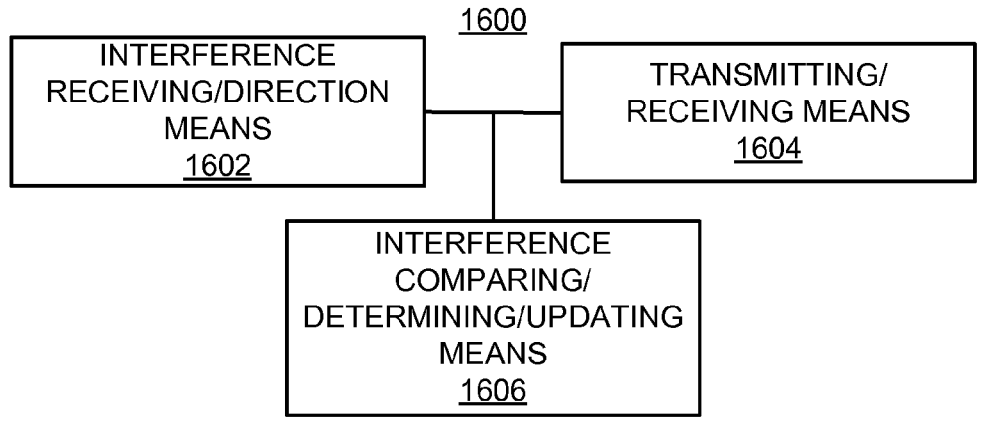
FIGS. 16-21 are simplified block diagrams of several sample aspects of apparatuses configured to manage interference as taught herein.
Figure 17:
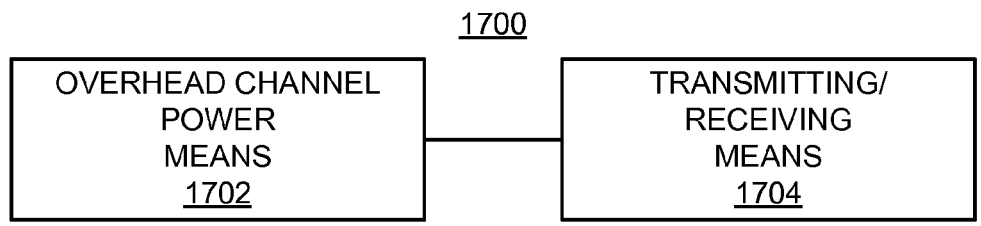
Figure 18:
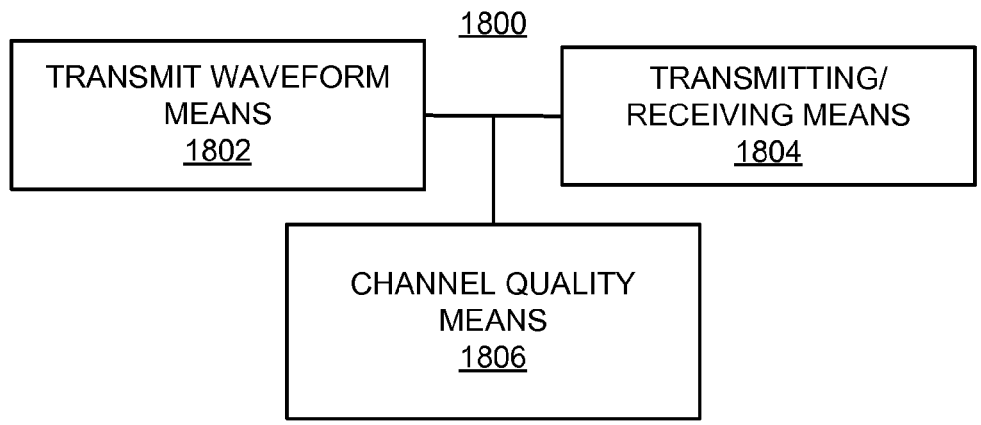
Figure 19:
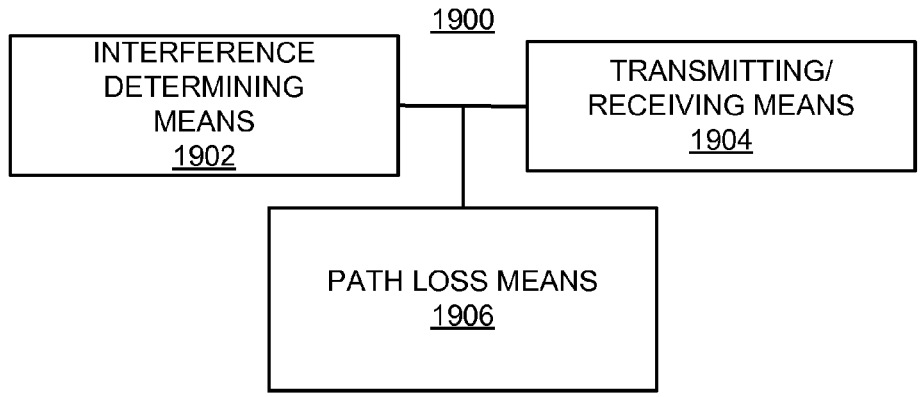
Figure 20:
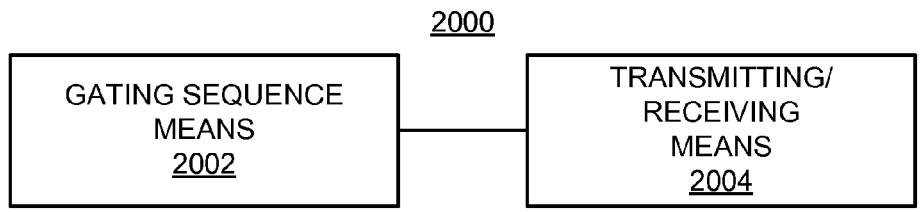
Figure 21:
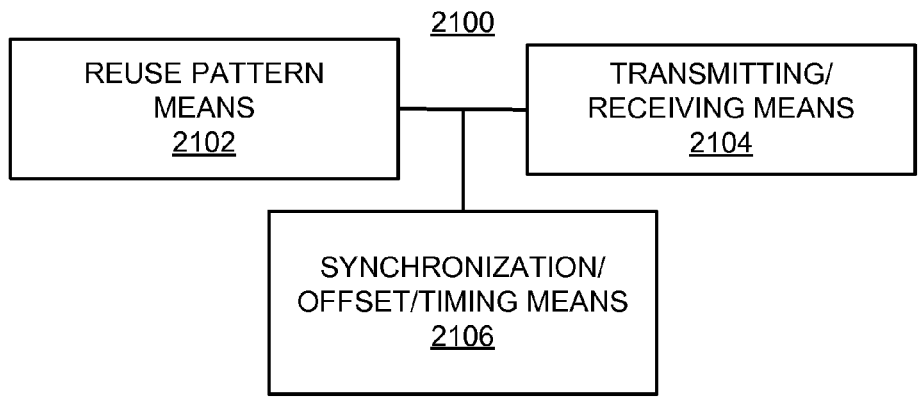

The teachings herein may be incorporated into a node (e.g., a device) employing various components for communicating with at least one other node. FIG. 15 depicts several sample components that may be employed to facilitate communication between nodes. Specifically, FIG. 15 illustrates a wireless device 1510 (e.g., an access point) and a wireless device 1550 (e.g., an access terminal) of a MIMO system 1500. At the device 1510, traffic data for a number of data streams is provided from a data source 1512 to a transmit ("TX") data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers ("XCVR") 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the device 1550, the transmitted modulated signals are received by $N_R$ antennas 1552A through 1552R and the received signal from each antenna 1552 is provided to a respective transceiver ("XCVR") 1554A through 1554R. Each transceiver 1554 conditions (e.g., filters, amplifies, and downconverts) a respective received signal, digitizes the conditioned signal to provide samples, and further processes the samples to provide a corresponding "received" symbol stream.

A receive ("RX") data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the device 1550 are received by the antennas 1524, conditioned by the transceivers 1522, demodulated by a demodulator ("DE-MOD") 1540, and processed by a RX data processor 1542 to extract the reverse link message transmitted by the device 1550. The processor 1530 then determines which pre-coding matrix to use for determining the beam-forming weights then processes the extracted message.

FIG. 15 also illustrates that the communication components may include one or more components that perform interference control operations as taught herein. For example, an interference ("INTER.") control component 1590 may cooperate with the processor 1530 and/or other components of the device 1510 to send/receive signals to/from another device (e.g., device 1550) as taught herein. Similarly, an interference control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the interference control component 1590 and the processor 1530 and a single processing component may provide the functionality of the interference control component 1592 and the processor 1570.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17)

technology, as well as 3GPP2 (1xRTT, 1xEV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 16-21, apparatuses 1600, 1700, 1800, 1900, 2000, and 2100 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatuses 1600, 1700, 1800, 1900, 2000, and 2100 may include one or more modules that may perform one or more of the functions described above with regard to various figures. In some aspects, one or more components of the interference controller 320 or the interference controller 322 may provide functionality relating to, for example, a interference receiving/direction means 1602, interference comparing/determining/updating means 1606, overhead channel power means 1702, transmit waveform means 1802, channel quality means 1806, interference determining means 1902, path loss means 1906, gating sequence means 2002, reuse pattern means 2102, and synchronization/offset/timing means 2106. In some aspects, the communication controller 326 or the communication controller 328 may provide functionality relating to, for example, transceiving (transmitting/receiving) means 1604, 1704, 1804, 1904, 2004, and 2104.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   determining a transmit waveform from among a plurality of allocated waveforms of an unplanned access point to an associated access terminal, the transmit waveform exhibiting a highest channel quality with the associated access terminal over others of the plurality of allocated waveforms, wherein the determining comprises:
      determining a default waveform as the transmit waveform from among the plurality of allocated waveforms; and
      designating a different one of the plurality of allocated waveforms as the transmit waveform when one of the plurality of allocated waveforms exhibits a higher channel quality; and
   transmitting signals according to the transmit waveform from the unplanned access point to the associated access terminal.

2. The method of claim 1, wherein determining comprises:
   testing the channel quality with the associated access terminal of each of the plurality of allocated waveforms of the unplanned access point; and
   selecting the transmit waveform as one from among the plurality of allocated waveforms exhibiting the highest channel quality.

3. The method of claim 2, wherein testing comprises for each of the plurality of allocated waveforms:
   transmitting a signal to the associated access terminal using one of the plurality of allocated waveforms; and
   receiving an indication of channel quality of the signal from the associated access terminal.

4. The method of claim 1, wherein the plurality of allocated waveforms are derived from coefficients of a digital Fourier transform matrix.

5. The method of claim 1, further comprising repeating determining a transmit waveform based on an update period.

6. The method of claim 1, further comprising repeating determining a transmit waveform based on deviation of a current channel quality by a channel quality degradation threshold from the highest channel quality.

7. The method of claim 1, wherein the transmit waveform is formed from coefficients of an N-tap channel filter.

8. The method of claim 7, wherein each of the coefficients are derived from a specific row in an N×N discrete Fourier transform matrix.

9. The method of claim 1, wherein the plurality of waveforms are derived from coefficients of a digital Fourier transform matrix, wherein the transmit waveform exhibits a highest channel quality in the presence of interference with the associated access terminal over others of the plurality of allocated waveforms, and wherein channel quality with the associated access terminal is tested for each of the plurality of allocated waveforms.

10. The method of claim 1, wherein determining the default waveform further comprises determining according to a defined selection process including a randomization process or an assignment process.

11. An apparatus for communication, comprising:
    an interference controller configured to:
       determine a transmit waveform from among a plurality of allocated waveforms of an unplanned access point to an associated access terminal, the transmit waveform exhibiting a highest channel quality with the associated access terminal over others of the plurality of allocated waveforms, wherein the interference controller is further configured to:
- determine a default waveform as the transmit waveform from among the plurality of allocated waveforms; and
- designate a different one of the plurality of allocated waveforms as the transmit waveform when one of the plurality of allocated waveforms exhibits a higher channel quality; and a communication controller configured to transmit signals according to the transmit waveform from the unplanned access point to the associated access terminal.

12. The apparatus of claim 11, wherein the inference controller is further configured to test the channel quality with the associated access terminal of each of the plurality of allocated waveforms of the unplanned access point, and select the transmit waveform as one from among the plurality of allocated waveforms exhibiting the highest channel quality.

13. The apparatus of claim 12, wherein the communication controller is further configured to, for each of the plurality of allocated waveforms, transmit a signal to the associated access terminal using one of the plurality of allocated waveforms, and receive an indication of channel quality of the signal from the associated access terminal.

14. The apparatus of claim 11, wherein the plurality of allocated waveforms are derived from coefficients of a digital Fourier transform matrix.

15. The apparatus of claim 11, wherein the interference controller is further configured to repeat determining a transmit waveform based on an update period.

16. The apparatus of claim 11, wherein the interference controller is further configured to repeat determining a transmit waveform based on deviation of a current channel quality by a channel quality degradation threshold from the highest channel quality.

17. The apparatus of claim 11, wherein the transmit waveform is formed from coefficients of an N-tap channel filter.

18. The apparatus of claim 17, wherein each of the coefficients are derived from a specific row in an N×N discrete Fourier transform matrix.

19. The apparatus of claim 11, wherein the plurality of waveforms are derived from coefficients of a digital Fourier transform matrix, wherein the transmit waveform exhibits a highest channel quality in the presence of interference with the associated access terminal over others of the plurality of allocated waveforms, and wherein channel quality with the associated access terminal is tested for each of the plurality of allocated waveforms.

20. The apparatus of claim 11, wherein the interference controller is further configured to determine the default waveform according to a defined selection process including a randomization process or an assignment process.

21. An apparatus for communication, comprising:
means for determining a transmit waveform from among a plurality of allocated waveforms of an unplanned access point to an associated access terminal, the transmit waveform exhibiting a highest channel quality with the associated access terminal over others of the plurality of allocated waveforms, wherein the means for determining comprises:
- means for determining a default waveform as the transmit waveform from among the plurality of allocated waveforms; and
- means for designating a different one of the plurality of allocated waveforms as the transmit waveform when one of the plurality of allocated waveforms exhibits a higher channel quality; and means for transmitting signals according to the transmit waveform from the unplanned access point to the associated access terminal.

22. The apparatus of claim 21, wherein the means for determining comprises:
- means for testing the channel quality with the associated access terminal of each of the plurality of allocated waveforms of the unplanned access point; and
- means for selecting the transmit waveform as one from among the plurality of allocated waveforms exhibiting the highest channel quality.

23. The apparatus of claim 22, wherein the means for testing comprises for each of the plurality of allocated waveforms:
- means for transmitting a signal to the associated access terminal using one of the plurality of allocated waveforms; and
- means for receiving an indication of channel quality of the signal from the associated access terminal.

24. The apparatus of claim 21, wherein the plurality of allocated waveforms are derived from coefficients of a digital Fourier transform matrix.

25. The apparatus of claim 21, further comprising means for repeating determining a transmit waveform based on an update period.

26. The apparatus of claim 21, further comprising means for repeating determining a transmit waveform based on deviation of a current channel quality by a channel quality degradation threshold from the highest channel quality.

27. The apparatus of claim 21, wherein the transmit waveform is formed from coefficients of an N-tap channel filter.

28. The apparatus of claim 27, wherein each of the coefficients are derived from a specific row in an N×N discrete Fourier transform matrix.

29. The apparatus of claim 21, wherein the plurality of waveforms are derived from coefficients of a digital Fourier transform matrix, wherein the transmit waveform exhibits a highest channel quality in the presence of interference with the associated access terminal over others of the plurality of allocated waveforms, and wherein channel quality with the associated access terminal is tested for each of the plurality of allocated waveforms.

30. The apparatus of claim 21, wherein the means for determining the default waveform further comprises means for determining according to a defined selection process including a randomization process or an assignment process.

31. A computer-program product, comprising:
a non-transitory computer-readable medium comprising codes for causing a computer to:
- determine a transmit waveform from among a plurality of allocated waveforms of an unplanned access point to an associated access terminal, the transmit waveform exhibiting a highest channel quality with the associated access terminal over others of the plurality of allocated waveforms, including to:
  - determine a default waveform as the transmit waveform from among the plurality of allocated waveforms; and
  - designate a different one of the plurality of allocated waveforms as the transmit waveform when one of the plurality of allocated waveforms exhibits a higher channel quality; and
- transmit signals according to the transmit waveform from the unplanned access point to the associated access terminal.

32. The computer-program product of claim 31, wherein the codes for causing the computer to determine comprise codes for causing the computer to:
  test the channel quality with the associated access terminal of each of the plurality of allocated waveforms of the unplanned access point; and
  select the transmit waveform as one from among the plurality of allocated waveforms exhibiting the highest channel quality.

33. The computer-program product of claim 32, wherein the codes for causing the computer to test comprise codes for causing the computer for each of the plurality of allocated waveforms to:
  transmit a signal to the associated access terminal using one of the plurality of allocated waveforms; and
  receive an indication of channel quality of the signal from the associated access terminal.

34. The computer-program product of claim 31, wherein the plurality of allocated waveforms are derived from coefficients of a digital Fourier transform matrix.

35. The computer-program product of claim 31, further comprise codes for causing the computer to repeat determining a transmit waveform based on an update period.

36. The computer-program product of claim 31, further comprising codes for causing the computer to repeat determining a transmit waveform based on deviation of a current channel quality by a channel quality degradation threshold from the highest channel quality.

37. The computer-program product of claim 31, wherein the transmit waveform is formed from coefficients of an N-tap channel filter.

38. The computer-program product of claim 37, wherein each of the coefficients are derived from a specific row in an N×N discrete Fourier transform matrix.

39. The computer-program product of claim 31, wherein the plurality of waveforms are derived from coefficients of a digital Fourier transform matrix, wherein the transmit waveform exhibits a highest channel quality in the presence of interference with the associated access terminal over others of the plurality of allocated waveforms, and wherein channel quality with the associated access terminal is tested for each of the plurality of allocated waveforms.

40. The computer program product of claim 31, wherein the code for determining the default waveform further comprises code for determining according to a defined selection process including a randomization process or an assignment process.

* * * * *